US012609558B2

(12) United States Patent
Davlantes et al.

(10) Patent No.: US 12,609,558 B2
(45) Date of Patent: Apr. 21, 2026

(54) WIRELESS POWER SYSTEM AND METHOD OF OPERATION

(71) Applicant: Reach Power, Inc., Redwood City, CA (US)

(72) Inventors: Christopher Joseph Davlantes, Redwood City, CA (US); Hunter Scott, Redwood City, CA (US)

(73) Assignee: Reach Power, Inc., Redwood City, CA (US)

(*) Notice: Subject to any disclaimer, the term of this patent is extended or adjusted under 35 U.S.C. 154(b) by 0 days.

(21) Appl. No.: 19/346,075

(22) Filed: Sep. 30, 2025

(65) Prior Publication Data

US 2026/0095067 A1 Apr. 2, 2026

Related U.S. Application Data

(60) Provisional application No. 63/701,385, filed on Sep. 30, 2024.

(51) Int. Cl.
| | |
|---|---|
| *H02J 50/27* | (2016.01) |
| *H01Q 1/28* | (2006.01) |
| *H01Q 21/06* | (2006.01) |
| *H01Q 21/24* | (2006.01) |
| *H02J 50/00* | (2016.01) |
| *H02J 50/40* | (2016.01) |

(52) U.S. Cl.
CPC .............. *H02J 50/27* (2016.02); *H01Q 1/28* (2013.01); *H01Q 21/062* (2013.01); *H01Q 21/24* (2013.01); *H02J 50/005* (2020.01); *H02J 50/402* (2020.01); *H02J 2310/44* (2020.01)

(58) Field of Classification Search
CPC ........ H02J 50/27; H02J 50/005; H02J 50/402; H02J 2310/44; H01Q 1/28; H01Q 21/062; H01Q 21/24
USPC ........................................................ 307/104
See application file for complete search history.

(56) References Cited

U.S. PATENT DOCUMENTS

| | | | |
|---|---|---|---|
| 12,261,455 | B2 | 3/2025 | Daviantes |
| 2012/0049650 | A1 | 3/2012 | Bella |
| 2019/0379134 | A1* | 12/2019 | Paulotto .............. H01Q 21/062 |
| 2021/0101680 | A1 | 4/2021 | Naderi et al. |
| 2022/0075966 | A1 | 3/2022 | Negishi |
| 2023/0142988 | A1* | 5/2023 | Towfiq ..................... H01Q 3/46 |
| | | | 343/702 |

(Continued)

OTHER PUBLICATIONS

Assimonis, et al., "Efficient and Sensitive Electrically Small Rectenna for Ultra-Low Power RF Energy Harvesting", Scientific Reports, (2018) 8:215038, DOI:10.1038/S41598-018-33388-W.

(Continued)

*Primary Examiner* — Rexford N Barnie
*Assistant Examiner* — Thai H Tran
(74) *Attorney, Agent, or Firm* — Jeffrey Schox; Samuel Rosenthal

(57) ABSTRACT

A wireless power system, preferably including a set of one or more substrates and a wireless power receiver, wherein the wireless power receiver preferably includes one or more radio frequency (RF) impedance sheets. A method of operation for a wireless power system, preferably including receiving power wirelessly and/or delivering power to one or more electrical loads, and optionally include deploying the system and/or stowing the system S240.

20 Claims, 12 Drawing Sheets

(56)                    References Cited

U.S. PATENT DOCUMENTS

2023/0187976 A1*    6/2023   Davlantes ............... H02J 50/50
                                                             307/104
2024/0162759 A1     5/2024   Davlantes et al.

OTHER PUBLICATIONS

Inclán-Sánchez, Luis, "Performance Evaluation of a Low-Cost Semi-transparent 3D-Printed Mesh Patch Antenna for Urban Communization Applications", Electronics 2024, 13, 153. https://doi.org/10.3390/electronics13010153, published Dec. 29, 2023.
Qin, et al., "A Highly Transparent Flexible Antenna Based on Liquid Metal Mesh Film", International Journal of RF and Microwave Computer-Aided Engineering, vol. 2023, Article ID 6369944, 12 pages, Apr. 26, 2023, https://doi.org/10.1155/2023/6369944.
Riviere, et al., "Design and Optimization of Wideband Multilayer Printed Antenna Arrays", EUMW 2013, Oct 2013, Nuremberg, Germany. hal-01058376, https://hal-onera.archives-ouvertes.fr/hal-01058376.
Sarin, et al., "Grating-based Dipole Antenna Configuration for High Gain Directional Radiation characteristics", Advanced Electromagnetics, vol. 6, No. 1, Feb. 2017, https://aemjournal.org/index.php/AEM/article/view/459.
Trovarello, et al., "Design of an Integrated Rectenna on Multi-Iayer High-Resistivity Silicon Substrate", ResearchGate, Conference Paper, Aug. 2023, DOI: 10.23919/URSIGASS7860.2023.10265455.
Waigih, et al., "Meshed High-Impedance Matching Network-Free Rectenna Optimized for Additive Manufacturing", IEEE Open Journal of Antennas and Prorogation, vol. 1, 2020, 10.1109/OJAP.2020.3038001, Nov. 16, 2020.

* cited by examiner

100

100

121a

121b

124a

124b

110

130

133

133

135

100

110

110

WIRELESS POWER SYSTEM AND METHOD OF OPERATION

CROSS-REFERENCE TO RELATED APPLICATIONS

This application claims the benefit of U.S. Provisional Application No. 63/701,385, filed 30 Sep. 2024, which is incorporated in its entirety by this reference.

STATEMENT OF GOVERNMENT SUPPORT

This invention was made with government support under Contract Number HR0011210126 awarded by the Defense Advanced Research Projects Agency. The government has certain rights in the invention.

TECHNICAL FIELD

This invention relates generally to the wireless power field, and more specifically to a new and useful wireless power system and method of operation.

DETAILED DESCRIPTION OF THE INVENTION

The following description of the embodiments of the invention is not intended to limit the invention to these embodiments, but rather to enable any person skilled in the art to make and use this invention.

1. Overview

Figure 1:
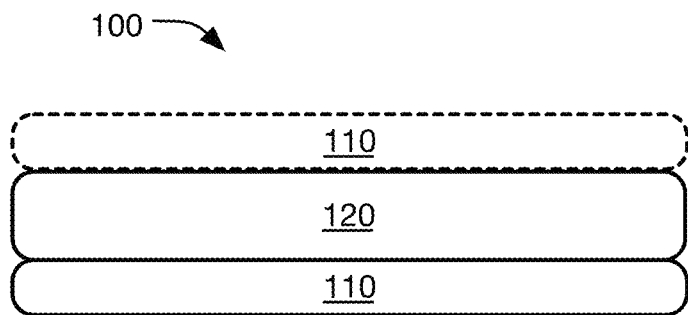
FIG. 1 is a schematic representation of an embodiment of a wireless power system.

A wireless power system 100 preferably includes a set of one or more substrates 110 and a wireless power receiver 120 (e.g., as shown in FIG. 1), wherein the wireless power receiver 120 preferably includes one or more radio frequency (RF) impedance sheets 121 (e.g., includes at least one absorber sheet 121a, and optionally includes one or more reflector sheets 121b). The wireless power system 100 can be configured to be integrated with a device having one or more electrical loads 131, preferably wherein the system 100 is configured to deliver electrical power 132 to the one or more electrical loads 131. In an example, the wireless power system 100 can be integrated with a vehicle 130 (e.g., as shown by way of examples in FIGS. 4, 10A, 10B, 11A, and/or 11B-11C), preferably an aerial vehicle (e.g., rotary wing vehicle, such as a quadcopter or other multirotor vehicle), but can additionally or alternatively be integrated with any other suitable vehicle, such as wherein the system 100 is operable to provide electrical power 132 to one or more electrical loads 131 of (and/or attached to) the vehicle 130. However, the wireless power system 100 can additionally or alternatively include any other suitable elements, have any other suitable functionality, and/or be integrated with any other suitable devices.

Figure 2:
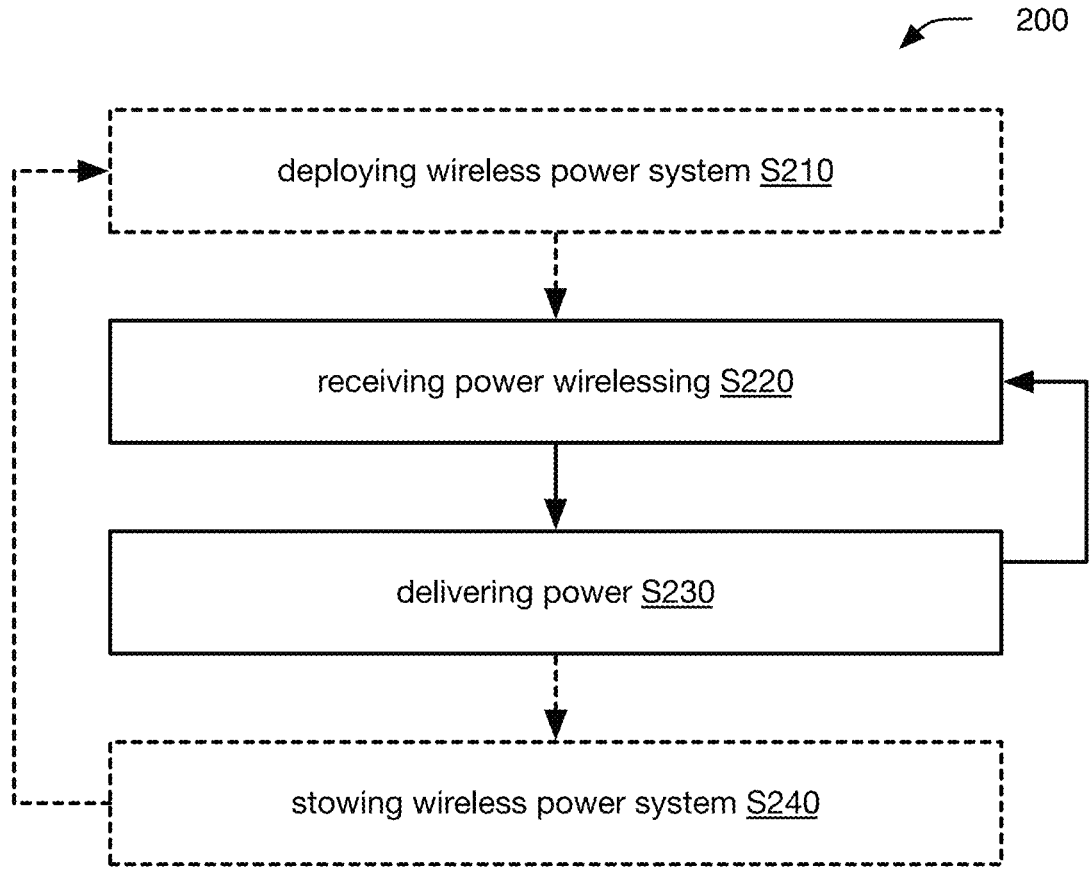
FIG. 2 is a schematic representation of an embodiment of a method of operation for a wireless power system.

A method 200 preferably includes receiving power wirelessly S220 and/or delivering power to one or more electrical loads S230, and can optionally include deploying the system S210 and/or stowing the system S240 (e.g., as shown in FIG. 2).

The wireless power system 100 is preferably operable to perform the method 200, but can additionally or alternatively be operable to perform any other suitable method(s) and/or have any other suitable functionality. The method 200 is preferably performed using the wireless power system 100, but can additionally or alternatively be performed using any other suitable system(s).

Figure 5A:
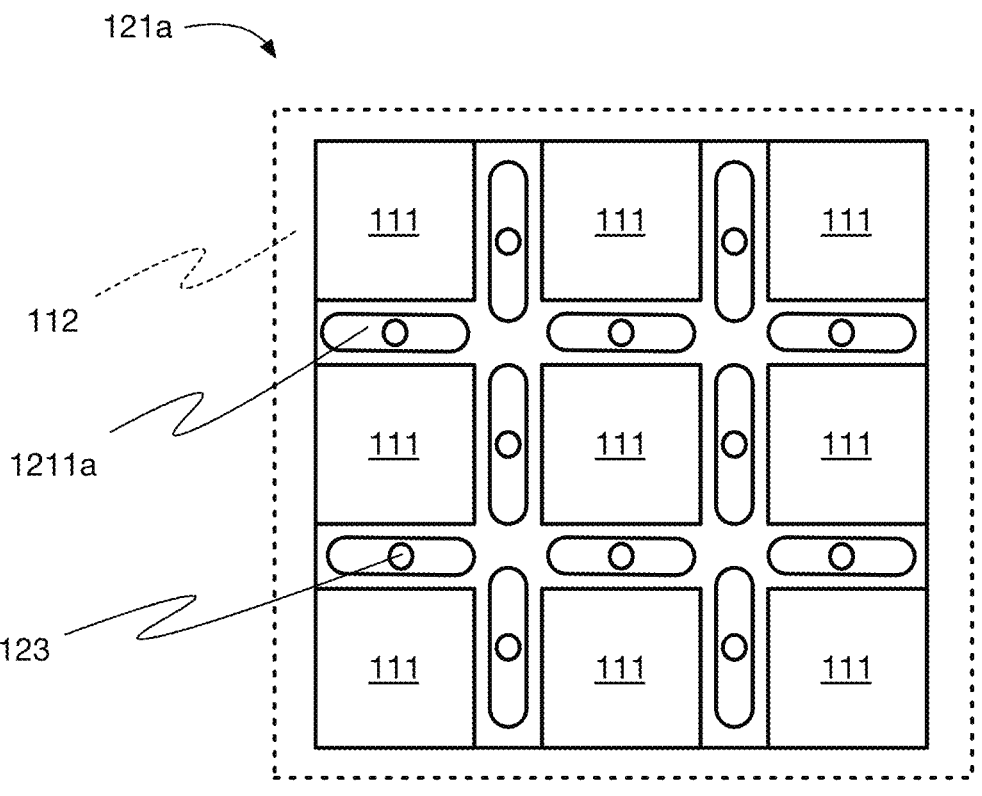
FIG. 5A is a plan view of an absorber sheet of a first example of the wireless power system.
Figure 5B:
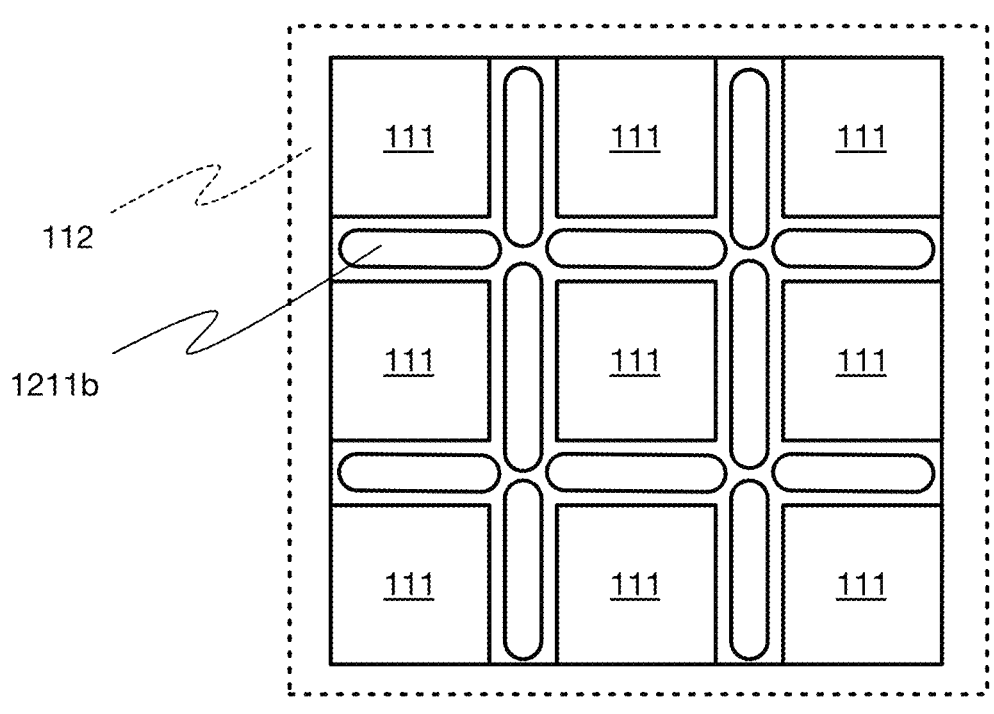
FIG. 5B is a plan view of a reflector sheet of the first example of the wireless power system.
Figure 5C:
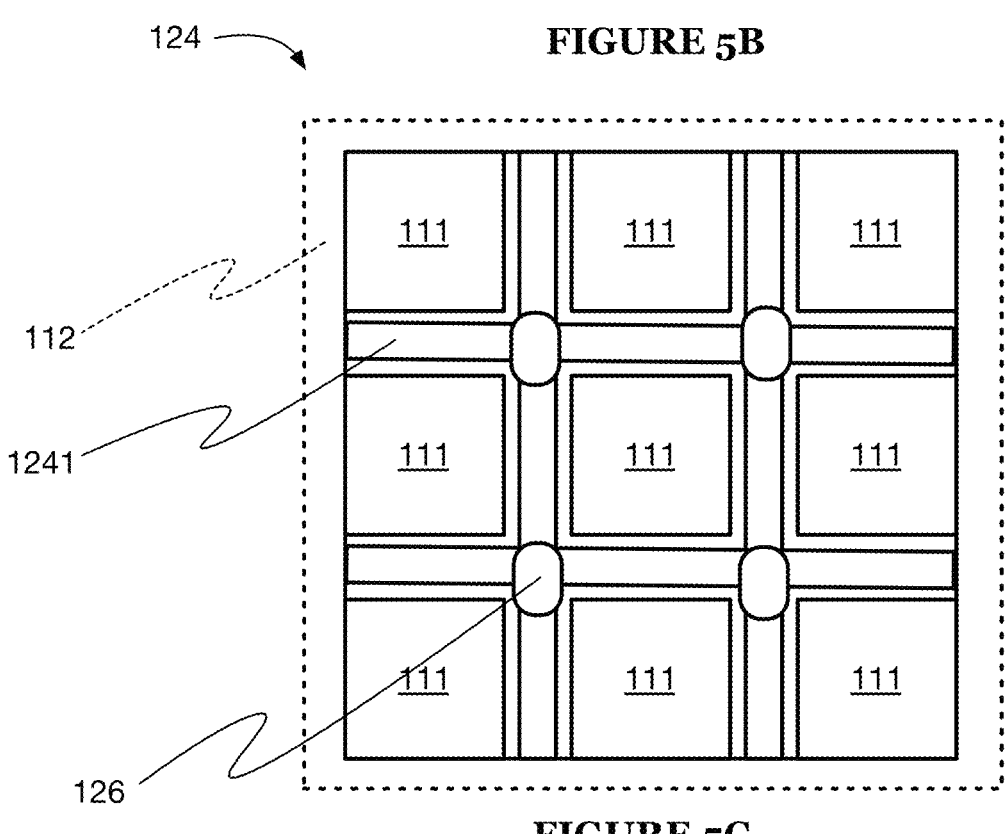
FIG. 5C is a plan view of a conductive manifold of the first example of the wireless power system.

In an illustrative example (e.g., as shown in FIGS. 5A-5C), a wireless power system includes a flexible multilayer (e.g., 4-layer) PCB (e.g., polyimide PCB) defining a plurality of square apertures arranged in a uniform square array (e.g., wherein the substrate and/or the system defines an occlusion ratio less than a threshold amount, such as less than 25%, 15%, 10%, 5%, or 2%, etc.), and a wireless power receiver configured to receive RF radiation at and/or around a design frequency between 5.8 and 5.9 GHz, corresponding to a free-space wavelength of about 5 cm (e.g., 0.0517-0.0508 m). For example, the flexible multilayer PCB substrate can include two polyimide sheets (e.g., each having a thickness between 0.002 and 0.01 inches, such as about 0.005 inches) connected along a broad face of each sheet by an adhesive layer (e.g., having a thickness between 0.0005 and 0.002 inches, such as about 0.001 inches), wherein one or more PCBA elements (e.g., conductive traces, electronic components such as surface-mount components, etc.) are arranged along each of the broad faces of the sheets, thereby defining a plurality of PCB layers (e.g., four PCB layers, corresponding to two for each substrate sheet). The wireless power receiver includes a first RF impedance sheet (e.g., absorber sheet) defined on a first PCB layer, a second RF impedance sheet (e.g., reflector sheet) defined on a second PCB layer, a first conductive manifold (e.g., for high-potential DC power conduction) defined on a third PCB layer, and a second conductive manifold (e.g., for low-potential DC power conduction) defined on a fourth PCB layer. The four PCB layers are preferably arranged substantially parallel each other, and are preferably arranged in order from first to fourth (wherein the second layer is between the first and third layers, and the third layer is between the second and fourth layers). The absorber sheet includes a plurality of RF absorber elements (e.g., dipole elements, such as center-fed dipoles), each electrically connected to a respective RF-DC converter (e.g., defined as an MMIC). The reflector sheet includes a plurality of RF reflector elements (e.g., dipole elements, such as dipoles of slightly greater length than the absorber elements). Each of the two conductive manifolds includes a plurality of electric-field-coupled resonators (e.g., including thin, elongated inductive regions and short, wide capacitive regions) that function both to collect and conduct DC electricity (e.g., to an electrical load connected to the wireless power system) and to tune the RF response of the multilayer stack, such as enabling the stack to achieve near-unity absorption at a design wavelength, even with interlayer spacing (e.g., between the absorber sheet and the reflector sheet) far less than one-quarter of the design wavelength. Each RF-DC converter is preferably electrically connected to the two conductive manifolds (e.g., wherein each RF-DC converter includes a first DC output terminal connected to the first manifold and a second DC output terminal connected to the second manifold), preferably wherein each such connection to a manifold is made via a conductive via through the substrate (e.g., from the first layer to the third or fourth layer). Elements of the system (e.g., elements that affect the interaction of the wireless power system with RF radiation) can be electromagnetically coupled (e.g., via one or more RF modes, preferably evanescent modes but additionally or alternatively propagating modes) to each other, such as wherein elements arranged on different layers (e.g., arranged on different layers within the same unit cell and/or neighboring unit cells) can be electromagnetically coupled in such a manner (e.g., wherein the separation between different layers is sufficiently small, such as smaller than and/or on the order of the RF resonance wavelength, that the different layers can act together to define an RF metamaterial); for example, within each unit cell, the absorber(s), reflector(s), and electric-field-coupled resonator(s) are preferably all electromagnetically coupled by a set of RF modes (e.g., evanescent modes and/or propagating modes, such as coupled through dielectrics, conductors, and/or apertures of the system).

Figures 7A, 7B:
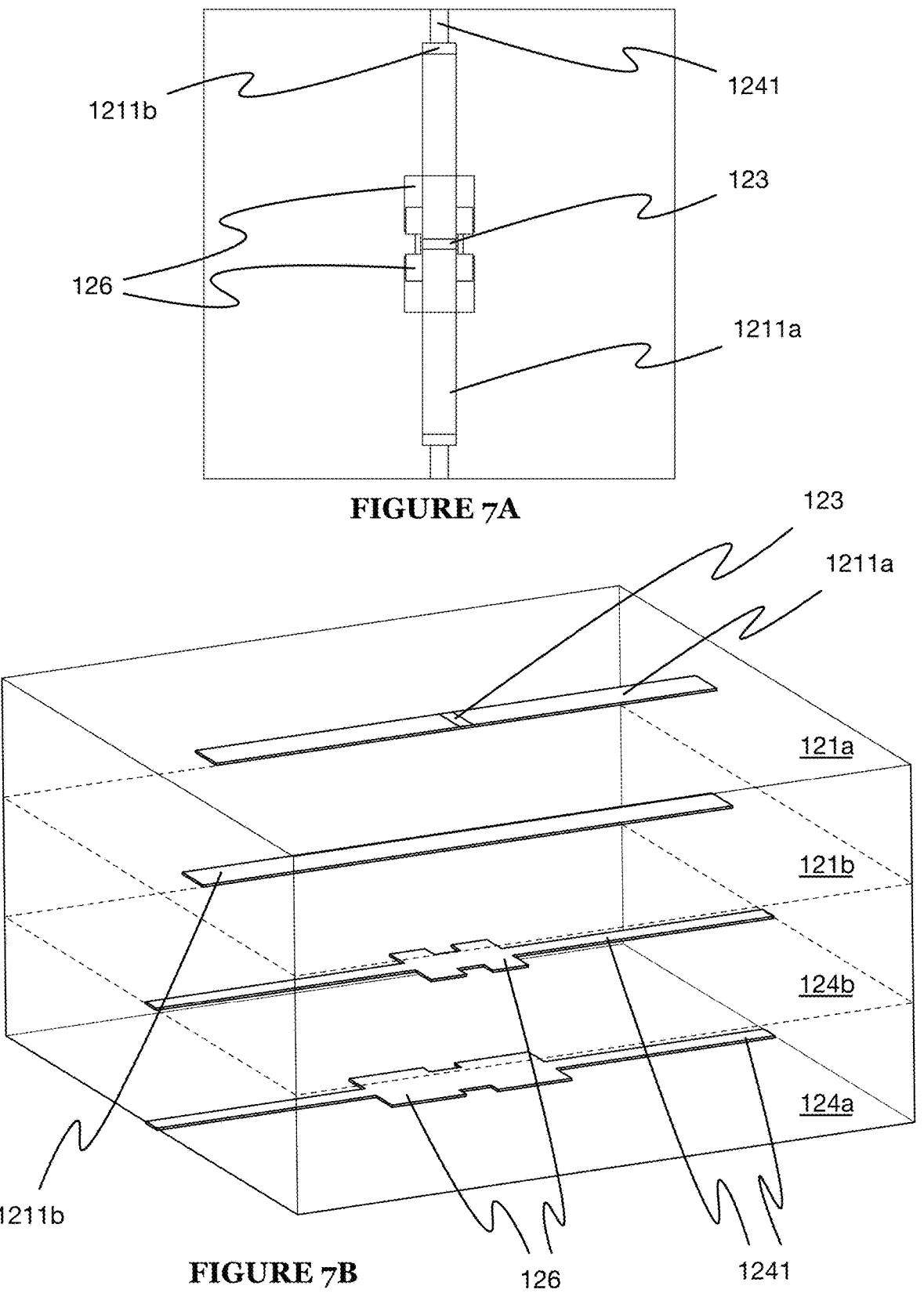
FIGS. 7A-7B are a plan view and an exploded isometric view, respectively, of a unit cell of a specific example of the wireless power system.
Figure 8:
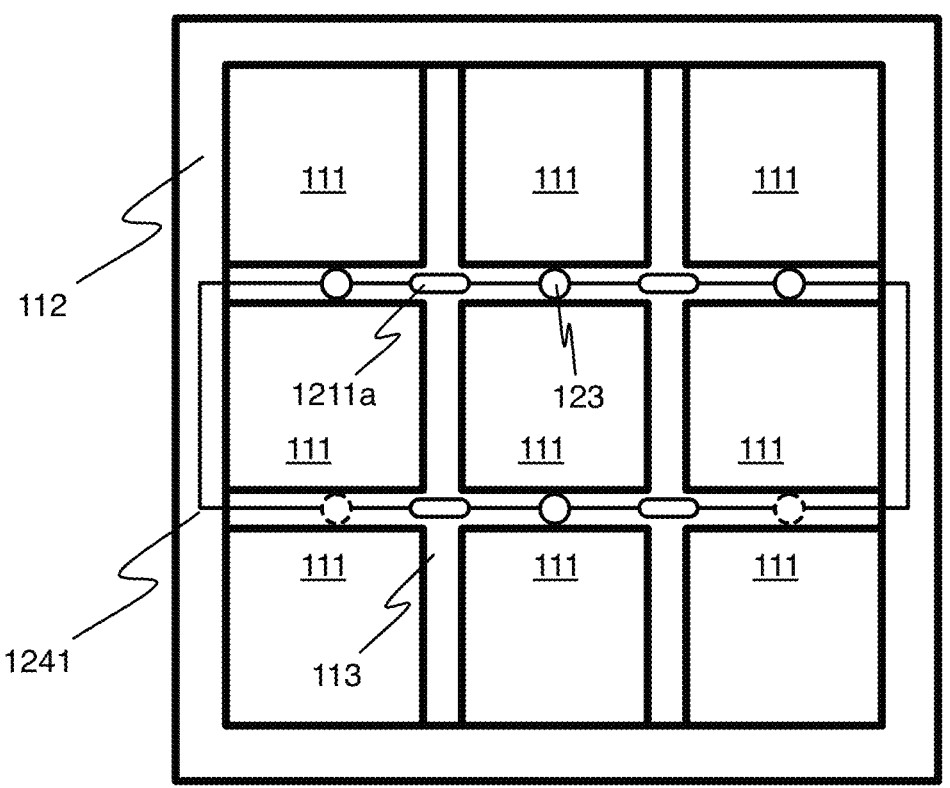
FIG. 8 is a schematic representation of an RF impedance sheet of a second example of the wireless power system.

In this example, the elements of the layers (or any suitable subset of the elements, such as the elements that affect the RF response of the system, some or all elements of any one or more layers, etc.) are preferably arranged in a regular array (e.g., planar array, such as a square or rectangular array, hexagonal array, etc.) defining a uniform (or substantially uniform) unit cell that is repeated throughout the array. For example, each unit cell can include one or more absorbers on the first PCB layer, one or more reflectors (e.g., the same as the number of absorbers) on the second PCB layer, one or more electric-field-coupled resonators (e.g., the same as the number of absorbers) defining an electrically connected grid on the third PCB layer, and one or more electric-field-coupled resonators (e.g., the same as the number of absorbers) defining an electrically connected grid on the fourth PCB layer. In a first specific example, the unit cell includes one absorber, one reflector, and one electric-field-coupled resonator each on the third layer and the fourth layer, such as wherein projections of these four components onto a single layer are all substantially aligned (e.g., as shown in FIGS. 7A-7B) or wherein projections of some of these four components onto a single layer are staggered relative to others (e.g., wherein the electric-field-coupled resonators are offset from the tap locations of the absorber). In a second specific example, the unit cell includes two absorbers, two reflectors, and one or two electric-field-coupled resonators each on the third layer and the fourth layer, such as wherein the two absorbers (and/or the two reflectors) have substantially different orientations from each other, such as substantially orthogonal orientations (e.g., as shown in FIGS. 5A-5C). However, the system can additionally or alternatively define any other suitable array of any suitable unit cell(s), and/or the elements of the system can additionally or alternatively have any other suitable arrangement.

However, the system can additionally or alternatively include any suitable elements having any suitable configuration and/or arrangement, and the method can additionally or alternatively include any suitable elements performed in any suitable manner.

2. Technical Advantages

Variants of the technology can confer one or more advantages over conventional technologies.

First, variants of the technology can receive power wirelessly during vehicle operation without requiring alterations to vehicle routing and operational parameters. This capability can enable extended mission duration by continuously replenishing the vehicle's energy stores while maintaining normal flight patterns and/or operational procedures. For example, an unmanned aerial vehicle (UAV) can receive wireless power transmission while performing surveillance or delivery tasks, reducing or eliminating the need to return to base for battery replacement or charging. This can reduce operational complexity by removing or mitigating the constraints of limited battery life and the logistical requirements for frequent charging cycles, thereby improving mission effectiveness and reducing downtime.

Second, variants of the technology can reduce interference with vehicle propulsion systems through an open structure design that allows rotor wash to travel through the wireless power receiver. This configuration can minimize aerodynamic disruption that might otherwise affect flight stability or propulsion efficiency. In a specific example, a multirotor aircraft equipped with the wireless power receiver can maintain optimal rotor performance since the downwash from the rotors can pass through the receiver structure, rather than being deflected significantly and/or creating turbulent airflow patterns. This design approach can aid in preserving (or minimizing departures from) the vehicle's original flight characteristics and/or performance specifications.

Third, variants of the technology can minimize impact on vehicle energy demand through lightweight construction materials and design optimization. The reduced mass of the wireless power receiver can decrease the additional power requirements needed to carry the receiver, thereby maximizing the net energy benefit received from wireless power transmission. For example, using lightweight materials (e.g., polymers, advanced composite materials, etc.) and/or optimized structural geometries (e.g., open, grid-like geometries) can keep the receiver weight below a threshold that would significantly impact flight time and/or payload capacity. This can result in improved overall energy efficiency and extended operational range.

Fourth, variants of the technology can achieve efficient wireless power reception and/or rectification through specialized components and design features. The system can utilize a set of tuned layers configured to provide near-unity RF absorption at a desired wavelength, maximizing the capture of transmitted electromagnetic energy. Additionally, custom integrated circuit (e.g., monolithic microwave integrated circuit (MMIC)) rectifiers can be employed to convert the received RF energy to DC power with high conversion efficiency. In a specific example, the tuned absorption layers can be optimized for specific frequencies and/or frequency bands (e.g., between 5.8-5.9 GHz) to achieve absorption coefficients approaching unity, while the MMIC rectifiers can provide rectification efficiencies exceeding conventional diode-based approaches.

Fifth, when not receiving power, variants of the technology can enable further vehicle performance optimization through a stowable wireless power receiver configuration. For example, the system can be designed to fold and/or otherwise collapse the receiver components when not in use, such as when the vehicle is outside the power transmission range and/or when the vehicle's energy storage is above a threshold charge level. This capability can reduce aerodynamic drag during portions of the mission where wireless power reception is not available or needed, thereby improving flight efficiency and extending range. For example, the receiver elements can be folded against the airframe and/or collapsed into a compact configuration in order to minimize their impact on vehicle aerodynamics and performance characteristics.

Sixth, variants of the technology can be manufactured using standard printed circuit board assembly (PCBA) materials and/or fabrication processes (e.g., for flexible PCBAs and/or rigid PCBAs). This fabrication approach can leverage existing PCBA fabrication infrastructure and/or established vendors and/or supply chains, potentially reducing production costs and/or development timelines, and/or simplifying procurement processes, as compared to specialized manufacturing processes.

However, further advantages can be provided by the system and method disclosed herein.

3. System

3.1 Substrates

The system can include one or more substrates 110. The set of substrates 110 functions to support one or more layers of the wireless power receiver (e.g., RF impedance sheets, conductive manifolds, etc.), and can additionally or alternatively be configured to support any other suitable elements of the system 100. Each substrate 110 is preferably lightweight (e.g., employing a small amount of material, such as defining a structure with many apertures 111, rather than a continuous or substantially continuous sheet-like structure) and/or minimally occlusive (e.g., having significant open space, such that the interference of the substrate 110 with airflow, such as airflow driven by one or more rotary wings, is negligible, minimized, and/or below a threshold value), but can additionally or alternatively be otherwise configured, such as shown by way of examples in FIGS. 5A-5C, 8, 11A, and/or 11B-11C. For example, the substrate(s) can include a plurality of apertures 111 (e.g., voids, openings, etc.), such as an array (e.g., regular or substantially regular array, irregular array, etc.) of apertures, preferably wherein the apertures (or a subset thereof) run through a thickness of the substrate between two opposing broad faces of the substrate (e.g., running substantially normal to the broad faces). In examples, each aperture can have dimensions (e.g., length, width, diameter, etc.) on the order of 0.1-2 times a design wavelength for the system (e.g., RF wavelength for which the system is optimized, such as a wavelength for which the system achieves near-unity absorption), such as 0.2-1 times the design wavelength (e.g., 0.2, 0.3, 0.4, 0.5, 0.6, 0.7, 0.8, 0.9, 1, 0.2-0.4, 0.4-0.6, 0.6-0.8, and/or 0.8-1 times the design wavelength); however, the apertures can additionally or alternatively have any other suitable dimensions. In some examples, the array (e.g., regular array) can be defined within an array region, wherein the array region can define one or more holes, discontinuities, and/or concavities. For example, the array region can define space to allow one or more other elements of the system and/or integrated vehicle (e.g., sensors, payload, flight systems, etc.) to protrude through the wireless power receiver (and/or through a plane on which the wireless power receiver is arranged).

In some variants, the substrate 110 (and/or the wireless power receiver as a whole) defines an occlusion ratio indicative of the portion of the substrate's area that is occluded by material (e.g., based on a footprint projected onto a plane parallel to a broad face of the substrate). Based on a projection of the substrate (or the wireless power receiver as a whole) onto a reference plane (e.g., parallel to a broad face of the substrate), the occlusion ratio can be calculated as the ratio of the occluded area within that projection to the area of its convex hull (e.g., for a substrate defining a rectangular perimeter, the area of the bounding rectangle). In examples, the occlusion ratio can be less than a threshold value, such as less than 2%, 5%, 10%, 15%, 20%, 25%, 35%, 50%, 70%, 1-2%, 2-5%, 5-10%, 10-15%, 15-20%, 20-30%, 30-40%, 40-60%, and/or 60-85%.

The substrate 110 is preferably flexible, but can additionally or alternatively be otherwise configured. For example, the substrate 110 can include (e.g., be made of) one or more flexible materials, such as flexible polymers (e.g., polyimide). However, the substrate 110 can additionally or alternatively include any other suitable materials.

In some examples, the substrate (e.g., flexible substrate) can have a thickness on the order of tens to hundreds of microns (e.g., wherein each polyimide sheet of the substrate is 0.001-0.02 inches thick, such as 0.002-0.01 inches, about 0.005 inches, etc.). Additionally or alternatively, the system can include one or more substrates (e.g., rigid substrates) having thicknesses on the order of millimeters (e.g., 0.5-3 mm, such as about 0.785 mm, about 0.8 mm, about 1.57 mm, about 2.36 mm, etc.), and/or can include substrates of any other suitable thicknesses.

The set of substrates 110 can be a substrate of a multi-layer (e.g., more than dual-layer) PCBA. In a variant, the substrate of a multi-layer PCBA can include a plurality of substrate sheets, such as wherein each such substrate sheet can include one or more elements (e.g., conductive traces, electrical components such as surface-mount components and/or any other suitable components, and/or any other suitable PCBA elements, etc.) defined on one or both broad faces of the substrate sheet, with adjacent substrate sheets mechanically connected by an adhesive bonding layer. In an example of the variant, the plurality of substrate sheets includes two substrate sheets (e.g., polyimide sheets, each having a thickness of about 0.005 inches) mechanically connected by an adhesive bonding layer (e.g., having a thickness of about 0.001 inches), such as wherein each substrate sheet supports two layers of the wireless power receiver (e.g., a first substrate sheet supporting an absorber sheet on a first broad face and supporting a reflector layer on a second broad face, and a second substrate sheet supporting a conductive manifold on each of its broad faces, wherein the second broad face of the first substrate sheet is adhered to a broad face of the second substrate sheet).

The substrate is preferably electrically insulating, but can additionally and/or alternatively be or include one or more electrically conductive materials, semiconducting materials, and/or any other suitable materials. The substrate can include (e.g., be made of) one or more materials such as polymers (e.g., polyimide, FR-4, PTFE, etc.), ceramics (e.g., alumina), and/or any other suitable materials.

In some examples, the substrate 110 can define one or more gridlines 113 (e.g., flexible gridlines, such as made from or including one or more flexible polymers). For example, these gridlines 113 can define a rectangular array (e.g., square array) with open space between the gridlines 113 (e.g., as shown in FIGS. 4A and/or 4B). Each substrate is preferably arranged parallel (or substantially parallel) to the other substrates and/or substantially aligned with the other substrates (e.g., overlapping, shared, and/or substantially identical footprints on a reference plane parallel to one or more of the substrates), but can additionally or alternatively be arranged at an oblique angle to the other substrates, offset from the other substrates, and/or have any other suitable arrangement. The substrate 110 is preferably configured to attach mechanically (and/or electrically) to a vehicle 130 (and/or to any other suitable device with which the system will be integrated), but can additionally or alternatively be configured to attach to any other suitable elements. As described above, the vehicle 130 is preferably an aerial vehicle (e.g., rotary wing vehicle, such as a quadcopter), but can additionally or alternatively be any other suitable vehicle.

In variants, the set of substrates 110 can optionally include one or more frames 112. The one or more frames 112 can include circumferential frames and/or any other suitable frames. In a first example, the substrate 110 can include a rigid frame (e.g., which can function to retain the substrate in a particular configuration). In a second example, the substrate 110 includes a flexible frame, such as a flexible frame configured to exert tensile forces on the interior material (e.g., on the flexible gridlines). In this example, the flexible frame can be operable to make the substrate tend toward an open arrangement (e.g., as opposed to a closed and/or stowed arrangement, such as a folded and/or rolled arrangement), such as a planar or substantially planar arrangement. The substrate 110 can additionally or alternatively include any other suitable frames.

However, the one or more frames 112 may be otherwise configured.

However, the set of substrates 110 may be otherwise configured.

3.2 Wireless Power Receiver

The wireless power receiver 120 functions to receive RF power transmitted wirelessly (e.g., transmitted via one or more propagating modes, preferably not via evanescent modes, but additionally or alternatively, via one or more evanescent modes). In variants, the wireless power receiver 120 includes a set of RF impedance sheets 121; a plurality of non-linear structures 123; and a set of conductive manifolds 124.

In some embodiments, the wireless power receiver 120 can include one or more elements such as described in U.S. patent application Ser. No. 18/674,945, filed 27 May 2024 and titled "SYSTEM AND METHOD FOR WIRELESS POWER RECEPTION", which is herein incorporated in its entirety by this reference (e.g., wherein the wireless power receiver 120 includes the 'system 100 for wireless power reception' as described therein or any suitable elements thereof, such as wherein the wireless power receiver includes one or more 'antennas 110' and/or 'RF-DC converters 130' defined on the one or more substrates 110). In some embodiments, the wireless power receiver 120 can be configured to operate such as described in U.S. patent application Ser. No. 18/891,137, filed 20 Sep. 2024 and titled "METHOD AND SYSTEM FOR WIRELESS POWER DELIVERY", which is herein incorporated in its entirety by this reference (e.g., wherein the wireless power receiver 120 can be configured to operate such as described therein regarding the 'receiver').

The impedance sheets 121 (and/or any suitable subset thereof, such as any two impedance sheets, and optionally in cooperation with any other suitable elements of the wireless power receiver, such as the conductive manifolds and/or resonant structures) are preferably configured to achieve substantially zero transmission and substantially unity absorption at a particular design wavelength (e.g., a specific RF wavelength) and/or throughout a particular band, more preferably wherein the absorption (or a majority thereof, such as almost all of the absorption, more than 90% of the absorption, etc.) occurs at the absorbers 1211a (and/or at any other suitable elements configured to convert the absorbed energy into an electrical output, rather than occurring as parasitic absorption elsewhere in the wireless power receiver).

For example, the RF elements (of all sheets, of at least two sheets, any suitable subset of the RF elements of such sheets, etc.) are preferably tuned to achieve this impedance response. In one example, wherein the wireless power receiver 120 includes two impedance sheets, each including a connected array of dipoles, the dipole lengths of the first impedance sheet and the dipole lengths of the second impedance sheet can be treated as two separate parameters, and tuned to achieve the desired properties of substantially zero transmission and substantially unity absorption at the design wavelength (e.g., wherein the two impedance sheets can define a metamaterial, and the dipole length on the two sheets can be used as two degrees of freedom to achieve the appropriate permittivity and permeability for the desired response at the design wavelength). For a receiver having a sufficiently high quality factor (e.g., achieved via a sufficiently small spacing between impedance sheets), the impedance sheets 121 can be substantially transparent to RF frequencies away from the design wavelength, thereby preventing undesired interference of the wireless power receiver 120 with RF transmissions sufficiently distinct from the design wavelength. However, the wireless power receiver 120 can additionally or alternatively include any other suitable elements in any suitable arrangement.

3.2.1 RF Impedance Sheets

The set of RF impedance sheets 121 functions to achieve high (e.g., near-unity) RF absorption within a desired band (e.g., at a particular design wavelength), preferably wherein all or substantially all of the absorption occurs within a set of antennas of the wireless power receiver. The set of RF impedance sheets 121 can include one or more RF impedance sheets (e.g., absorber sheets 121a, reflector sheets 121b, director sheets 121c, etc.; wherein the set of RF impedance sheets preferably includes at least one absorber sheet, and can optionally include one or more reflector sheets and/or director sheets in addition to the absorber sheet(s)).

In some variants, the set of RF impedance sheets includes an absorber sheet (or multiple absorber sheets) and one or more other RF impedance sheets. In such variants, any reflector sheet(s) are preferably arranged behind the absorber sheet(s) relative to a propagation direction for incoming RF radiation (such that the radiation reaches the absorber sheet(s) before the reflector sheet(s)), and/or any director sheet(s) are preferably arranged in front of the absorber sheet(s) relative to the propagation direction (such that the radiation reaches the absorber sheet(s) after the director sheet(s)). However, the RF impedance sheets can additionally or alternatively have any other suitable arrangement relative to each other.

Figure 6A:
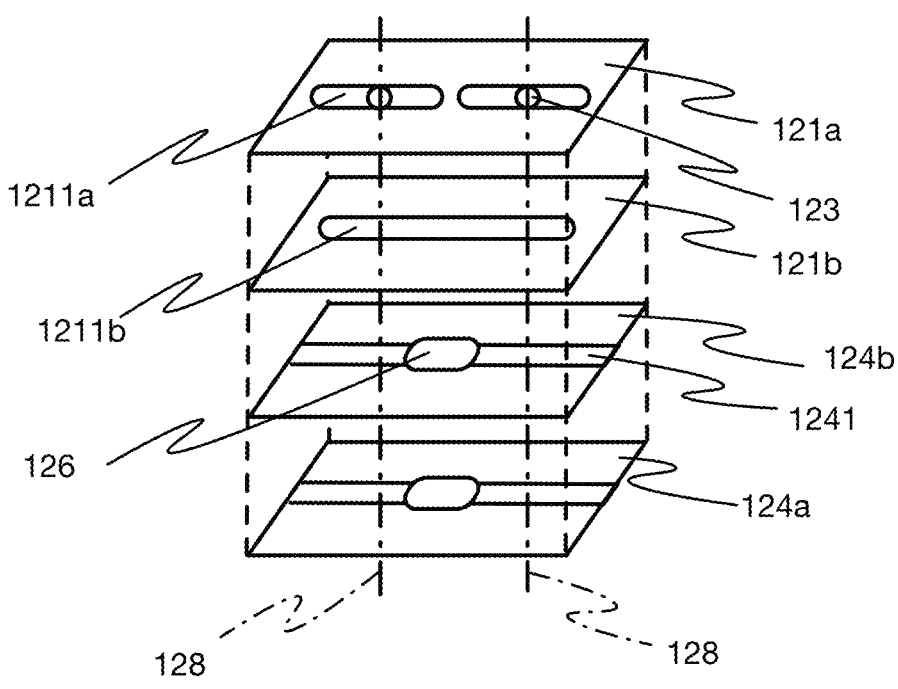
FIGS. 6A-6B are exploded isometric views of a unit cell of a third and fourth example, respectively, of the wireless power system.
Figure 6B:
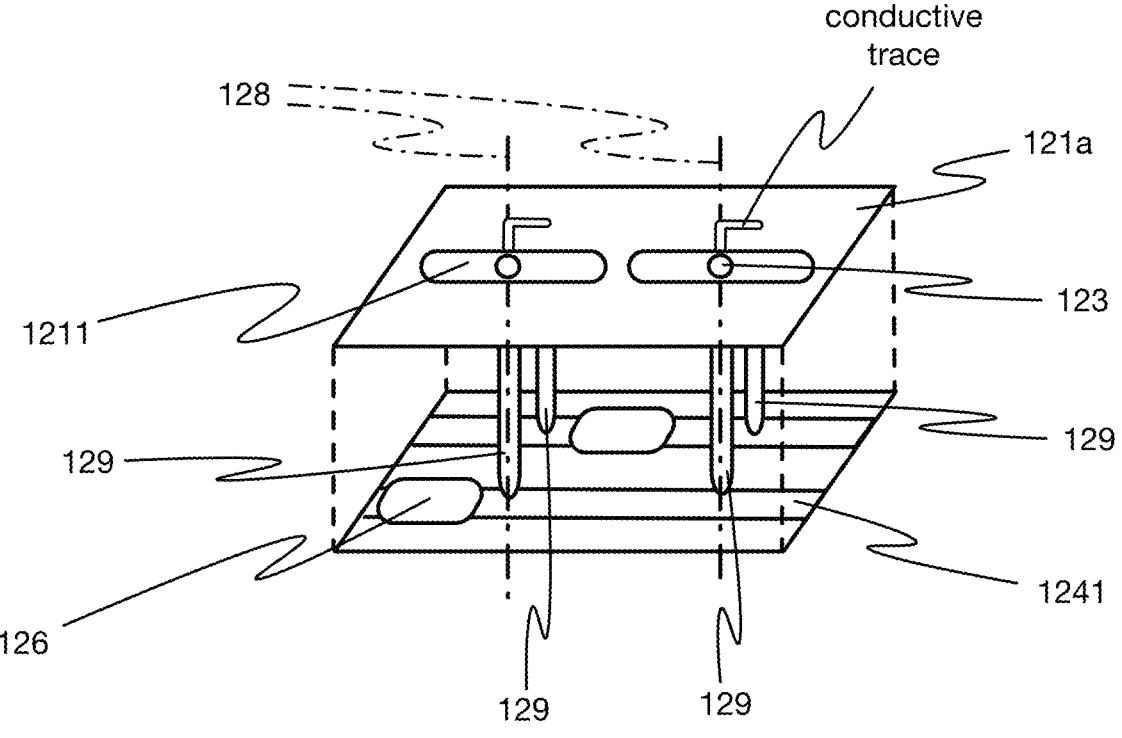

In a first variant, the system includes a single RF impedance sheet (e.g., as shown in FIG. 6B).

In a second variant, the system includes two RF impedance sheets. In a first example of this variant, the system includes an absorber sheet 121a and a reflector sheet 121b (e.g., as shown by way of examples in FIGS. 3B, 5A-5B, 6A, and/or 7A-7B), preferably wherein the reflector sheet is arranged behind the absorber sheet relative to a propagation direction for incoming RF radiation. In a second example of this variant, the system includes an absorber sheet 121a and a director sheet 121b, preferably wherein the reflector sheet is arranged in front of the absorber sheet relative to a propagation direction for incoming RF radiation.

Figures 3A, 3B:
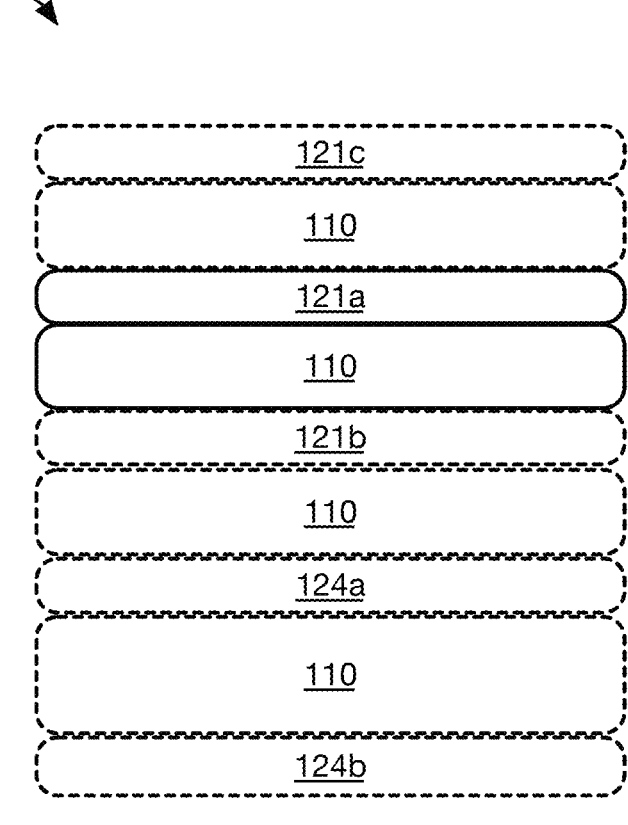
FIG. 3A-3B are schematic representations of a first and second variant, respectively, of the wireless power system.
Figure 4:
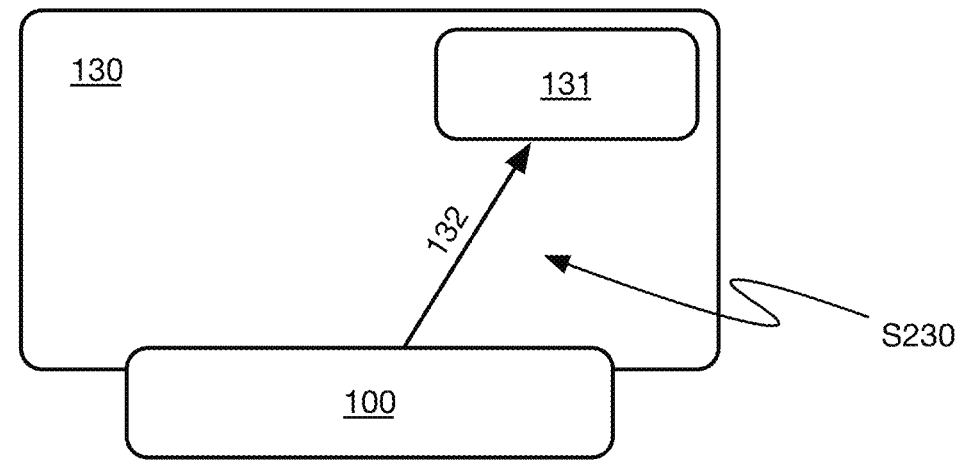
FIG. 4 is a schematic representation of an embodiment of the wireless power system integrated with a vehicle.

In a third example, the system includes three RF impedance sheets, such as an absorber sheet 121a, a reflector sheet 121b, and a director sheet 121c, preferably wherein the absorber sheet is arranged between the director sheet and the reflector sheet, more preferably with the director sheet arranged in front of the other two sheets relative to a propagation direction for incoming RF radiation (e.g., as shown in FIG. 3A).

In a fourth variant, the system includes more than three RF impedance sheets. For example, the system can include an absorber sheet 121a, a reflector sheet 121b (e.g., arranged behind the absorber sheet relative to a propagation direction for incoming RF radiation), and a plurality of director sheets 121c (e.g., each arranged in front of the absorber sheet relative to the propagation direction).

Each impedance sheet 121 is preferably attached to (e.g., defined on) a substrate 110 of the system 100, but can additionally or alternatively be otherwise attached to the substrate 110. In a first example, the receiver can include multiple impedance sheets defined on a single substrate (e.g., including two total sheets, each defined on an opposing side of a single substrate; including at least one sheet defined on an exterior surface of the substrate, and at least one sheet defined within the bulk of the substrate; etc.). In a second example, the receiver can include impedance sheets defined on different substrates (e.g., including one impedance sheet defined on each substrate, such as one sheet on each of two total substrates of the system). In a third example, the receiver can include both multiple sheets defined on a single substrate (e.g., defined on opposing sides of the substrate, within the bulk of the substrate, etc.), and sheets defined on different substrates (e.g., wherein one or more additional substrates can each include a single impedance sheet, can each include two impedance sheets defined on opposing sides of the substrate, etc.). In a fourth example, the receiver can include an impedance sheet defined within the bulk of a substrate (e.g., as shown in FIG. 3B). However, the sheets can additionally or alternatively be arranged on (e.g., on the surface(s) of, within the bulk of, etc.) the substrate(s) 110 in any other suitable manner.

The spacing defined between the impedance sheets 121 (e.g., spacing between substantially parallel substantially planar sheets) is preferably small, but can additionally or alternatively be otherwise configured, wherein a reduced spacing between the sheets can function to achieve a high quality factor for the wireless power receiver 120 (resulting in a correspondingly narrow bandwidth). For example, the spacing between the sheets can be defined by the thickness of a substrate on which two sheets are defined (e.g., on opposing sides of the substrate), such as being in a range of tens of microns (e.g., 10 μm, 20 μm, 50 μm, etc.). However, the impedance sheets 121 can additionally or alternatively have any other suitable arrangement relative to each other. The set of RF impedance sheets 121 can additionally or alternatively include any other suitable RF impedance sheets (e.g., impedance sheets with both absorbers and reflectors, impedance sheets with any suitable elements that affect the RF impedance properties of the sheets, etc.).

The RF impedance sheets 121 preferably include a plurality of RF elements 1211. In variants, the set of RF impedance sheets includes an absorber sheet 121a (or multiple absorber sheets), and can optionally include one or more reflector sheets 121b and/or any other suitable impedance sheets.

One or more of the RF impedance sheets are preferably absorber sheets 121a (e.g., as shown by way of examples in FIGS. 3A, 3B, 5A, 6A, and/or 6B), but can additionally or alternatively be otherwise configured. The absorber sheet 121a preferably functions to absorb incoming RF radiation (e.g., within a desired band, such as at a desired frequency), but can additionally or alternatively be otherwise configured. Each absorber sheet 121a preferably includes a plurality of absorbers 1211a (e.g., arranged in a regular array, electromagnetically coupled, such as DC coupled, to one or more conductive elements 1241 via a respective non-linear structure), but can additionally or alternatively be otherwise configured. The absorber sheet 121a can optionally include any other suitable RF elements and/or any other suitable elements in any suitable arrangement.

However, the absorber sheet 121a may be otherwise configured.

The reflector sheet 121b can be one or more of the RF impedance sheets. The reflector sheet 121b can function to reflect incoming RF radiation (e.g., within the desired band, at the desired frequency). The reflector sheet(s) can function to reflect incoming RF radiation (e.g., within the desired band, at the desired frequency). In an example, after RF radiation passes through one or more absorber sheets, it can be reflected by a reflector sheet back to the absorber sheet(s), thereby enabling additional absorption during this return pass. The reflector sheet 121b is preferably parallel to the absorber sheet, but can additionally or alternatively be oriented at an oblique angle to the absorber sheet and/or have any other suitable orientation. The reflector sheet 121b is preferably arranged close to the absorber sheet, such as no farther than the substrate thickness (e.g., less than 1 mm, 500 microns, 200 microns, 100 microns, etc.), but can additionally or alternatively be arranged about one-quarter wavelength from the absorber sheet (e.g., for a design wavelength for the wireless power receivers, such as a resonance wavelength of the RF impedance sheets), greater than one-quarter wavelength from the absorber sheet, and/or at any other suitable separation. The reflector sheet 121b is preferably arranged behind the absorber sheet with respect to an expected power reception direction (e.g., wherein RF power transmitted to the system is expected to arrive at a first broad face of the substrate closest to the absorber sheet, such as wherein the absorber sheet is defined on the first broad face or defined closer to the first broad face than the reflector sheet is), but can additionally or alternatively have any other suitable arrangement with respect to incoming RF radiation. The reflector sheet 121b is preferably arranged between the absorber sheet and the conductive manifold(s), but can additionally or alternatively have any other suitable arrangement. The reflector sheet 121b preferably includes a plurality of reflectors 1211b (e.g., in an arrangement substantially matching that of the absorbers, such as arranged in a regular array with the same unit cell dimensions and/or orientation as the absorbers, arranged substantially overlapping the absorbers, and/or analogous to the absorber arrangement in any other suitable manner, etc.), but can additionally or alternatively be otherwise configured.

However, the reflector sheet 121b may be otherwise configured.

The plurality of RF elements 1211 functions to define RF impedance properties of the RF impedance sheet(s) and/or of the wireless power receiver.

The plurality of RF elements 1211 can include dipole elements, resonant elements, and/or any other RF elements. The dipole elements can include center-fed dipoles (such as shown by way of examples in FIGS. 5A, 6A, and/or 6B), end-fed dipoles (such as shown by way of example in FIG. 8), folded dipoles, and/or any other dipole elements. The resonant elements can include loop resonators and/or any other resonant elements (e.g., resonant antenna elements). Additionally or alternatively, the RF elements can include subarrays (e.g., connected subarrays) of the elements described above (and/or any other suitable of any other suitable elements). For example, the plurality of RF elements can include a plurality of connected subarrays of antenna elements, wherein each connected subarray includes a plurality of antenna elements (e.g., dipole elements) electrically connected to each other (e.g., wherein each such connected subarray can be associated with and electrically connected to a single respective rectifier or other non-linear structure).

The RF elements (e.g., of the wireless power receiver, of each RF impedance sheet thereof, of any suitable subset of the RF impedance sheets, etc.) are preferably arranged in a regular (or substantially regular) array, such as an array defined by the substrate 110 (e.g., by the gridlines 113 thereof), but can additionally or alternatively be otherwise arranged; examples are depicted in FIGS. 5A-5C and/or 8. In a first example, the RF elements are dipole antennas arranged in a grid-like pattern (e.g., regular array) along the gridlines of the substrate. In a second example, the RF elements can be Vivaldi antennas (e.g., arranged in a regular array). More generally, the RF elements are preferably arranged on (e.g., defined on) the substrate 110 without occluding the open space (e.g., apertures) defined by the substrate 110, but can alternatively be otherwise arranged. Accordingly, the RF elements are preferably arranged substantially along any gridlines 113 and/or other structures defined by the substrate 110 (e.g., as shown in FIGS. 5A, 5B, and/or 8), but can alternatively be otherwise arranged. However, the RF elements can additionally or alternatively have any other suitable arrangement.

The RF elements (e.g., of a single impedance sheet or any suitable subset thereof, of multiple impedance sheets such as multiple absorber sheets, etc.) can define a connected array, wherein the different RF elements are electromagnetically coupled to each other. In a first embodiment, one or more impedance sheets (e.g., absorber sheets) can include a plurality of absorbers (e.g., dipoles, such as center-fed dipoles and/or side-fed dipoles), each connected (e.g., via a respective non-linear structure such as a rectifier) to one or more conductive manifolds (e.g., as shown in FIG. 6B). In a second embodiment, an impedance sheet (e.g., absorber sheet) can include a plurality of dipole elements, each connected to neighboring dipoles at their ends (e.g., at the current nodes of the dipoles), such as shown by way of example in FIG. 8. The connected array preferably provides for DC coupling between the coupled elements, but more preferably does not provide for RF coupling between these elements (e.g., thereby preventing emergence of multi-mode functionality in the impedance sheet). To achieve such coupling, the connected array can include one or more additional structures (e.g., arranged at or near the current nodes at which the different elements are connected) and/or non-linear elements such as rectifiers (e.g., electrically coupling each RF element of the connected array to one or more conductive manifolds).

In examples, these structures can include inductive structures (e.g., inductors configured to provide DC coupling, but not RF coupling), harmonic matching structures, such as structures configured to preserve odd harmonics, but destroy or substantially destroy even harmonics (e.g., one or more parasitic structures, such as notches, cuts, stubs, and the like), and/or any other suitable structures. The RF elements of an impedance sheet 121 can be connected (e.g., connected for DC, but preferably not for RF) in series and/or in parallel. In a first example, a first plurality of RF elements can be connected in parallel to a first pair of conductive manifolds (e.g., a first positive manifold and a first negative manifold), a second plurality of RF elements can be connected in parallel to a second pair of conductive manifolds (e.g., a second positive manifold and a second negative manifold), and/or any other similar configurations; in this example, two or more of these pairs of conductive manifolds can be connected in series (e.g., the first positive manifold connected in series with the second positive manifold, and the first negative manifold connected in series with the second negative manifold). In a second example, a plurality of RF elements can be connected in series to their neighbors along one direction of an array (e.g., wherein the array includes end-to-end connections between neighboring dipoles), wherein different sets of series-connected elements (e.g., different rows of series-connected dipoles) are connected in parallel. However, the impedance sheets can additionally or alternatively include any other suitable electrical couplings and/or connections.

The RF elements of an impedance sheet (and/or of the wireless power receiver as a whole) are preferably of the same kind (e.g., all dipole elements, all resonant elements, etc.), but an impedance sheet (and/or the wireless power receiver as a whole) can alternatively include multiple kinds of RF elements. Each RF element (and/or a collection of RF elements, such as an impedance sheet) can define a polarization (e.g., linear, such as a particular linear orientation; circular, such as right- or left-handed circular; elliptical, such as defining a particular eccentricity, major axis orientation, and/or handedness; etc.), wherein this polarization preferably describes the polarization dependence of one or more RF characteristics (e.g., absorption, such as for an absorber; reflection, such as for a reflector; etc.) defined by the RF element and/or collection of RF elements. In a first embodiment, an impedance sheet includes a first set of RF elements having a first polarization (e.g., first linear polarization orientation) and a second set of RF elements having a second polarization from the first (e.g., second linear polarization orientation different from the first, such as orthogonal or substantially orthogonal to the first), such as shown by way of examples in FIGS. 5A and/or 5B. In a second embodiment, the RF elements of a first impedance sheet have a different polarization orientation than the RF elements of a second impedance sheet. In an example of the second embodiment, the RF elements of a single impedance sheet have a polarization which is orthogonal to the polarization of the RF elements on another impedance sheet. The RF elements of each impedance sheet are preferably substantially aligned with the RF elements of the other impedance sheets (e.g., wherein a projection of the other RF elements onto the impedance sheet in question preferably has significant overlap with the RF elements of the impedance sheet in question, such as wherein each projected RF element overlaps and/or is aligned with, such as having the same or substantially the same center location and/or major axis position and orientation, an RF element of the impedance sheet in question), but the RF elements of one impedance sheet can additionally or alternatively be offset from elements of the other layers, and/or have any other suitable alignment with respect to the other impedance sheets.

In variants, the plurality of RF elements 1211 includes one or more absorbers 1211a, and optionally includes one or more reflectors 1211b, one or more directors, and/or any other suitable RF elements.

The absorbers 1211a preferably function to absorb RF radiation (e.g., of a particular frequency, such as a frequency at which a wireless power transmission system transmits RF power wirelessly). In an example, each absorber 1211a can be a dipole element (e.g., center-fed dipole). The absorber 1211a preferably defines one or more tap axes 128 (e.g., normal to the RF impedance sheet, normal to a broad face of the substrate, etc.), but can additionally or alternatively be otherwise configured, wherein each such tap axis intersects a tap point of the absorber. In a first example, a center-fed dipole defines a tap axis at its center. In a second example, an end-fed dipole defines two tap axes, one at each end of the dipole. A person of skill in the art will recognize that tap points are typically connection locations along the antenna element at which feedlines and/or other circuits can be attached (e.g., to achieve desired impedance matching and/or specific electrical characteristics). For the absorbers of the system, the tap points can be used to connect to the non-linear structures (e.g., rectifiers) and/or to any other suitable elements.

However, the absorber 1211a may be otherwise configured.

The system can optionally include one or more reflectors 1211b, which can function to enhance absorption of RF radiation by reflecting the radiation toward the absorber sheet(s) (e.g., toward the absorbers thereof). The reflector 1211b can include antenna elements (e.g., of the same type as and/or different types from the absorbers) and/or any other suitable RF reflector structures. In an example, the reflector can be a dipole element having a second length greater (e.g., slightly greater) than a first length of absorber dipole elements (e.g., 2%, 5%, 10%, 15%, 25%, 0-2%, 2-5%, 5-10%, 10-20%, and/or 20-30% greater, etc.), such as wherein an absorber and a nearby reflector cooperatively define a Yagi antenna.

However, the reflector 1211b may be otherwise configured.

The system can optionally include one or more directors, which can function to enhance absorption of RF radiation by directing the radiation toward the absorber sheet(s) (e.g., toward the absorbers thereof). The director can include antenna elements (e.g., of the same type as and/or different types from the absorbers and/or the reflectors) and/or any other suitable RF reflector structures. In an example, the director can be a dipole element having a second length shorter (e.g., slightly shorter) than a first length of absorber dipole elements (e.g., 2%, 5%, 10%, 15%, 25%, 0-2%, 2-5%, 5-10%, 10-20%, and/or 20-30% shorter, etc.), such as wherein an absorber and one or more nearby directors (and optionally a nearby reflector) cooperatively define a Yagi antenna.

However, the plurality of RF elements 1211 may be otherwise configured.

However, the set of RF impedance sheets 121 may be otherwise configured.

3.2.2 Non-Linear Structures

The plurality of non-linear structures 123 can function as one or more RF-to-DC converters (e.g., wherein the one or more non-linear structures define a class F converter in cooperation with one or more inductive and/or parasitic structures of the impedance sheets 121, such as structures defined in and/or between the RF elements). Each such structure preferably includes one or more RF input terminals (e.g., two RF input terminals, such as a positive or hot RF input terminal and a negative or ground RF input terminal) and one or more DC output terminals (e.g., two DC output terminals, such as a positive or high-potential DC output terminal and a negative or low-potential DC output terminal), but can additionally or alternatively be otherwise configured. In some examples, some or all of the non-linear structures can include one or more elements such as described in U.S. patent application Ser. No. 19/061,808, filed 24 Feb. 2025 and titled "SYSTEM AND METHOD FOR WIRELESS POWER RECEPTION", which is incorporated herein in its entirety by this reference (e.g., wherein each non-linear structure can be an RF-DC converter such as described therein).

Each non-linear structure of the plurality of non-linear structures 123 is preferably electrically connected to a respective RF element of the plurality of RF elements, but can additionally or alternatively be otherwise connected. In a first example, the non-linear structure can be connected to the center of an RF element (e.g., center-fed dipole). In a second example, the non-linear structure can be connected at the ends of an RF element (e.g., end-fed dipole). In a third example, the non-linear structure can be connected elsewhere along an RF element. In examples, the non-linear structures 123 can include one or more diodes, transistors, capacitors, inductors, switches, and/or any other suitable structures.

Figure 9A:
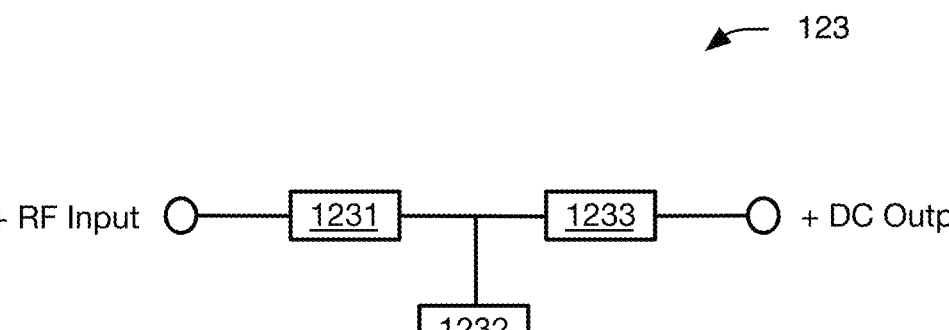
FIGS. 9A-9B are schematic representations of a first and second example, respectively, of a non-linear structure.
Figure 9A:
Figure 9B:
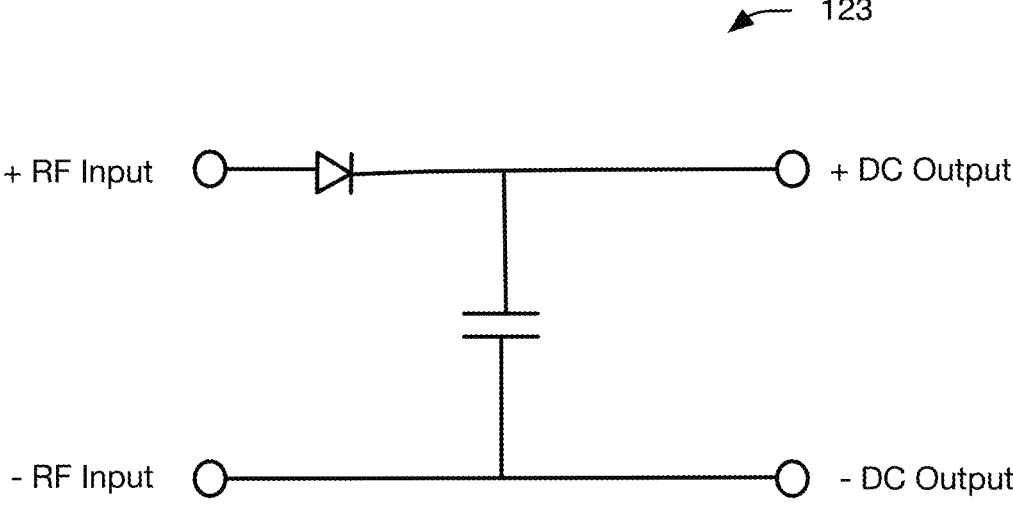

A non-linear structure can include one or more matching networks (e.g., input matching network 1231, harmonic matching network 1232, output matching network 1233, etc.). In a first example, an RF-DC converter (e.g., including and/or implemented as an integrated circuit) includes an input matching network electrically coupling a first RF input terminal to a junction, an output matching network electrically coupling the junction to a first DC output terminal, and a harmonic matching network electrically coupling the junction to a diode, wherein the diode electrically couples a second RF input terminal and a second DC output terminal to the harmonic matching network (e.g., as shown in FIG. 9A). In a second example, an RF-DC converter (e.g., including and/or implemented as discrete components, such as surface-mount components on a PCB) includes a diode electrically coupling a first RF input terminal to a first DC output terminal, and includes a capacitor electrically coupling the first DC output terminal to a second RF input terminal and a second DC output terminal (e.g., as shown in FIG. 9B). The plurality of non-linear structures 123 can be arranged on one or more of the impedance sheets, one or more substrates, and/or in any other suitable location. In an example, each non-linear structure can be arranged in contact with (e.g., defined on top of) and electrically connected to a respective RF element (e.g., absorber).

The non-linear structure 123 can be implemented as an integrated circuit (e.g., monolithic microwave integrated circuit (MMIC)), using discrete components (e.g., capacitors, diodes, inductors, resistors, etc.), such as part of a PCBA, and/or any other implementation.

The non-linear structures 123 can enable the wireless power receiver 120 to deliver DC output power (e.g., to one or more connected electrical loads, such as a load of and/or attached to a device with which the wireless power receiver 120 is integrated, such as to an aerial vehicle to which the wireless power receiver 120 is attached).

In a variant, the plurality of non-linear structures 123 can be configured to tolerate operation at elevated temperatures (e.g., arising from inefficiencies in RF power absorption and/or rectification). In a first example of the variant, the non-linear structures (e.g., semiconductor devices thereof) can be operated significantly below breakdown voltage (e.g., no more than 75-80% of breakdown voltage), such as to avoid thermal runaway. In a second example of the variant, the system can additionally or alternatively include GaN devices and/or other semiconductor devices configured to tolerate elevated temperatures.

In one example, the absorber sheet includes a plurality of center-fed dipole elements (e.g., arranged in a substantially regular array). In this example, each dipole element of the absorber sheet includes a non-linear structure (e.g., rectifier, such as an RF-DC converter IC) arranged at and electrically connected to the center of the dipole (e.g., wherein the conductive material of the dipole element is discontinuous at the center, such that the two sides of the dipole are not directly electrically connected, but rather are electrically coupled via the non-linear structure). In this example, the non-linear structure preferably includes a first RF input terminal electrically connected to a first side of the dipole element, a second RF input terminal electrically connected to a second side of the dipole element (opposing the first side across the non-linear structure), a first DC output terminal electrically connected (e.g., by a first via) to a first conductive manifold, and a second DC output terminal electrically connected (e.g., by a second via) to a second conductive manifold.

However, the plurality of non-linear structures 123 may be otherwise configured.

3.2.3 Conductive Manifolds

The set of conductive manifolds 124 functions to collect and transmit DC power (e.g., to one or more connected electrical loads 131, preferably a load of and/or attached to a device with which the wireless power receiver 120 is integrated, such as one or more electrical loads of an aerial vehicle with which the wireless power receiver 120 is integrated). The set of conductive manifolds 124 can include one or more conductive manifolds. In a first example, the system includes a single conductive manifold. In a second example, the system includes two conductive manifolds. In a third example, the system includes more than two conductive manifolds. The set of conductive manifolds 124 preferably includes at least two conductive manifolds (e.g., defining two sides of a circuit between the rectifiers and the loads), but can additionally or alternatively be otherwise configured, wherein one sheet can be at high potential and the other sheet can be at low potential.

Each conductive manifold is preferably electrically connected to each non-linear structure of the plurality (e.g., via a respective via 129 extending between the layer of the non-linear structure and the layer of the conductive manifold, such as shown by way of example in FIG. 6B, in which, for each rectifier, a respective first via extends between a first manifold and a first DC output of the rectifier, and a respective second via extends between a second manifold and a trace connected to a second DC output of the rectifier), but can additionally or alternatively be otherwise electrically connected. In an example, a first conductive manifold 124a is electrically connected to the first output terminal of each of a plurality of non-linear structures, and a second conductive manifold 124b is electrically connected to the second output terminal of each of the plurality of non-linear structures.

Each conductive manifold can define any suitable structure and/or topology, such as a grid, a sheet (e.g., substantially continuous sheet), a loop, a branching structure (e.g., tree structure, Tee structure, etc.), a non-branching structure (e.g., straight line, Cee structure, etc.), and/or any other suitable structure and/or topology.

The conductive manifolds are more preferably parallel (or substantially parallel) to the RF impedance sheet(s), but can additionally or alternatively be otherwise oriented. The conductive manifolds are preferably planar (or substantially planar), and are preferably parallel (or substantially parallel) to the RF impedance sheet(s) and/or each other, but can additionally or alternatively be arranged at an oblique angle to the RF impedance sheets and/or to each other, be non-planar, and/or have any other suitable shape, arrangement, and/or orientation. Different conductive manifolds can be coplanar (e.g., interdigitated, arranged side-by-side, etc.) and/or defined on different planes (and/or in different volumes). Each conductive manifold is preferably attached to (e.g. defined on) a substrate 110 of the system 100, but can additionally or alternatively be otherwise attached.

In a first example, the receiver 120 includes multiple conductive manifolds defined on a single substrate (e.g., each sheet is defined on an opposing side of a single substrate, or each sheet is defined on the same side of a single substrate). In a second example, the receiver 120 can include conductive manifolds defined on different substrates (e.g., including one conductive manifold defined on each substrate, such as one sheet on each of two total substrates of the system 100). In a third example, the receiver can include both multiple manifolds defined on a single substrate and sheets defined on different substrates. The conductive manifolds 124 are preferably electrically coupled to the plurality of RF elements via the non-linear structures (e.g., wherein each non-linear structure is electrically connected between a different RF element and one or more conductive manifolds, such as one high-potential manifold and one low-potential manifold such as a ground manifold), such as wherein each RF element of a set (e.g., each absorber of the system) is electrically coupled to one or more conductive manifolds (preferably, to two conductive manifolds) via a respective non-linear structure (e.g., rectifier). However, the conductive manifolds can additionally or alternatively be electrically coupled to the RF elements via one or more external conversion circuits and/or via any other suitable elements. The conductive manifolds 124 (e.g., resonators thereof) are preferably electromagnetically coupled (e.g., via a set of one or more RF modes, preferably evanescent modes but additionally or alternatively propagating modes) to the plurality of RF elements.

In variants, the set of conductive manifolds 124 includes one or more conductive elements 1241, and can optionally include and/or define one or more resonant structures 126.

The conductive elements 1241 can include conductive traces (e.g., copper traces, such as defined on a PCB), thin-film conductors, DC buses, vias, and/or any other conductive element.

The conductive elements of a conductive manifold are preferably electrically connected to all other conductive elements of that manifold (e.g., wherein the manifold is defined by the network of continuously connected conductive elements), but can additionally or alternatively be otherwise connected. The conductive elements of each conductive manifold are preferably aligned (or substantially aligned) with the conductive elements of the other conductive manifolds, with the RF elements of the impedance sheet(s), and/or with the gridlines of the substrate(s), but can additionally or alternatively be otherwise aligned. In some embodiments, the substrate has a broad planar (or substantially planar) face (e.g., with the set of apertures defined through the substrate normal or substantially normal to the broad face), wherein normal projections, onto the broad face, of the different layers of the wireless power receiver (e.g., different conductive manifolds and/or RF impedance sheets) and/or of the substrate itself have significant overlap with each other (e.g., wherein the projections of one or more of these layers lies substantially within the projections of one or more other layers of the wireless power receiver).

In one example, the wireless power receiver can include two conductive manifolds and two RF impedance sheets (e.g., an absorber sheet and a reflector sheet), each arranged on the substrate on different parallel layers; in this example, the normal projections, onto the broad face of the substrate, of each of these four elements (the two conductive manifolds and the two RF impedance sheets) and of the substrate itself preferably all have significant overlap with each other (e.g., wherein all other projections lie entirely within the projection of the substrate, wherein the projections of the two conductive manifolds are substantially mutually overlapping such that they lie entirely or substantially within each other, wherein the projections of the two RF impedance sheets lie entirely or substantially within the projections of the two conductive manifolds, wherein the projection of the absorber sheet lies entirely or substantially within the projection of the reflector sheet, etc.). In specific examples, for a first projection to lie substantially within a second projection, the area of the first projection that exceeds the bounds of the second projection can be limited to no more than a threshold fraction (e.g., 1%, 2%, 3%, 5%, 10%, 15%, 20%, 25%, 35%, 0-1%, 1-2%, 2-5%, 5-10%, 10-20%, and/or 20-35%, etc.) of the total area of the first projection, the second projection, the union of the two projections, and/or the intersection of the two projections. However, the elements of the wireless power system can additionally or alternatively overlap and/or be aligned to any other suitable extent, and/or can have any other suitable arrangement relative to each other.

The conductive manifold 124 is preferably arranged parallel (or substantially parallel) to the RF impedance sheets, but can additionally or alternatively have any other suitable orientation. The plurality of conductive elements 1241 are preferably aligned (or substantially aligned) with the RF elements of the impedance sheet 121 (e.g., as shown in FIGS. 7A-7B, which depict a single unit cell of a specific example of the wireless power receiver). In an example, normal projections of the conductive manifold and the impedance sheet onto a broad face of the substrate can result in substantial overlap between the projections. The conductive elements can be arranged on (e.g., defined on) the substrate 110 without occluding the open space defined by the substrate 110. Accordingly, the conductive elements can be arranged substantially along any gridlines 113 and/or other structures defined by the substrate 110. In an example, a conductive manifold includes (e.g., is made of) a set of copper traces defined on a substrate 110 of the system 100. Each copper trace of the set can be electrically connected to all other copper traces of the set, thereby forming a connected grid (e.g., having an arrangement defined by the substrate, such as by the gridlines 113 thereof, wherein the traces do not protrude into the apertures defined therethrough).

However, the plurality of conductive elements 1241 may be otherwise configured.

The system can optionally include one or more resonant structures 126, which can function to tune the RF response (e.g., absorption, reflection, and transmission) of the wireless power receiver (e.g., in cooperation with the RF impedance sheets), such as to achieve near-unity absorption (e.g., at the absorbers) for a design wavelength (e.g., RF resonance wavelength). The resonant structures 126 are preferably arranged on (e.g., defined on) the same substrate(s) as the conductive elements, but can additionally or alternatively be arranged on a separate substrate or in any other suitable arrangement. The resonant structures 126 are preferably electrically connected to (and/or define part of, are defined by, etc.) a conductive manifold (e.g., integrated with one or more conductive elements thereof), but can additionally or alternatively be electrically isolated from the conductive manifolds and/or have any other suitable connectivity and/or arrangement. In an example, a conductive element can include thin, elongated traces that define inductive regions and/or include widened structures that define capacitive regions, thereby defining a resonant structure that forms a part of a conductive manifold of the system. The resonant structures 126 are preferably arranged offset from (e.g., not intersecting, not centered on, etc.) each tap axis 128 (e.g., as shown in FIG. 6B) defined by the RF elements (e.g., aligned with a gap between antenna elements, rather than aligned with the antenna elements), but can additionally or alternatively have any other suitable arrangement.

The resonant structure 126 can include LC resonators (e.g., ELC resonator), quarter wave transformers, stub tuners, microstrip resonators, helical resonators, ring resonators, patch resonators, and/or any other resonant structure.

However, the resonant structures 126 may be otherwise configured.

However, the set of conductive manifolds 124 may be otherwise configured.

However, the wireless power receiver 120 may be otherwise configured.

3.3 Vehicle

As described above, the system (e.g., the wireless power receiver thereof) can be integrated with (and/or configured to be integrated with) a vehicle 130. The vehicle 130 is preferably an aerial vehicle (e.g., rotary wing vehicle, such as a multirotor vehicle; fixed wing vehicle; etc.), but can additionally or alternatively be any other suitable vehicle.

In variants, the vehicle 130 includes an electrical load 131, and can optionally include: rotors 133, a housing, and/or vibration mitigation.

The electrical load 131 can include an energy store (e.g., electrical energy store, such as one or more batteries, capacitor banks, supercapacitors, ultracapacitors, etc.) and/or a motor (e.g., operable to propel the vehicle, such as by powering rotors of the vehicle).

However, the electrical load 131 may be otherwise configured.

The vehicle can optionally include rotors 133, which can function to propel and/or steer the vehicle.

In a first variant, the rotors 133 can be part of a multirotor vehicle including at least three rotors (e.g., in a substantially coplanar arrangement). In a first embodiment, the vehicle includes four substantially coplanar rotors in a substantially rectangular (e.g., square) arrangement (e.g. as shown by way of examples in FIGS. 10A, 10B, 11A, and/or 11B-11C). In a second embodiment, the vehicle includes six substantially coplanar rotors in a substantially regular hexagonal arrangement.

In a second variant, the rotors 133 can be part of a helicopter (e.g., single rotor helicopter including a main rotor and a counter-torque rotor; dual rotor helicopter such as a tandem rotor helicopter, coaxial rotor helicopter, synchropter, etc.; compound helicopter; tilt rotor helicopter; etc.).

However, the rotors 133 may be otherwise configured.

The vehicle can optionally include a housing, which can function to house other elements of the vehicle (e.g., electrical load, sensors, control electronics, etc.). The housing can define a central body 135 (e.g., at or near a center point between the rotors) and a set of rotor supports (e.g., arranged peripherally around the central body), wherein the central body preferably houses the energy store and/or control electronics of the vehicle, but can additionally or alternatively house other components.

However, the housing may be otherwise configured.

The vehicle can optionally include vibration mitigation, which can function to damp vibrations and/or isolate the vehicle and/or elements thereof (e.g., sensors such as an inertial measurement unit (IMU)) from vibrations (e.g., arising at the wireless power receiver, such as due to rotor wash, flight dynamics, and/or any other suitable sources).

Vibration mitigation elements can be mechanically coupled to the wireless power receiver (e.g., wherein the wireless power receiver is mechanically coupled to the vehicle via the vibration dampers), to vehicle elements requiring and/or benefitting from vibration damping (e.g., sensors such as an IMU), and/or to any other suitable elements of the vehicle and/or the system.

The vibration mitigation can include foam (e.g., soft foam, rigid foam, etc.), rubber (e.g., rubber vibration-isolation mounts), and/or any other suitable materials for vibration mitigation (e.g., vibration isolation, vibration damping, etc.).

However, the vibration mitigation may be otherwise configured.

The vehicle 130 can optionally include one or more cooling mechanisms configured to remove heat from the wireless power receiver. In a first example, the one or more cooling mechanisms can include one or more cooling fans (e.g., not configured to contribute significantly to vehicle lift and/or maneuvering), such as fans that direct airflow toward the wireless power receiver. In a second example, the cooling mechanisms can include one or more holes defined through the central body (e.g., wherein the central body is configured in an annular arrangement around the hole defined therethrough), preferably configured to promote airflow through the central body (e.g., to and/or through the wireless power receiver, which can be arranged directly below the central body and/or the hole(s) therethrough), but can additionally or alternatively be otherwise configured, thereby functioning to promote heat dissipation (e.g., from the wireless power receiver). In a third example, the cooling mechanisms can include one or more air scoops configured to redirect some rotor downwash toward the wireless power receiver (e.g., toward the center thereof, where heat generation may be the greatest and/or airflow in the absence of the air scoops may be the least). In a fourth example, the cooling mechanisms can include thermally conductive connections between the wireless power receiver and the vehicle (e.g., housing thereof), which can function to conduct heat away from the wireless power receiver to the vehicle. In a fifth example, the cooling mechanisms can include a combination of any suitable aspects of two or more of the examples described above.

However, the vehicle 130 may be otherwise configured.

3.4 Arrangements

Figure 10A:
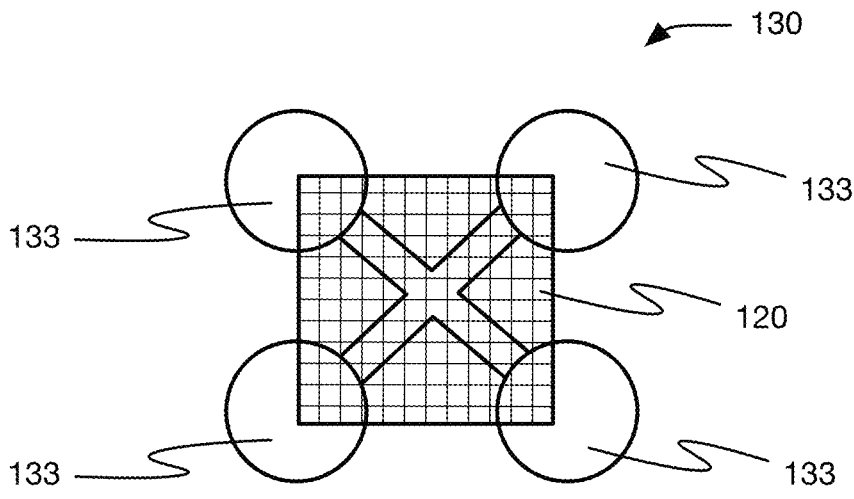
FIG. 10A-10B are bottom-up views of a first and second variant, respectively, of the wireless power system integrated with a multirotor aerial vehicle.
Figure 10B:
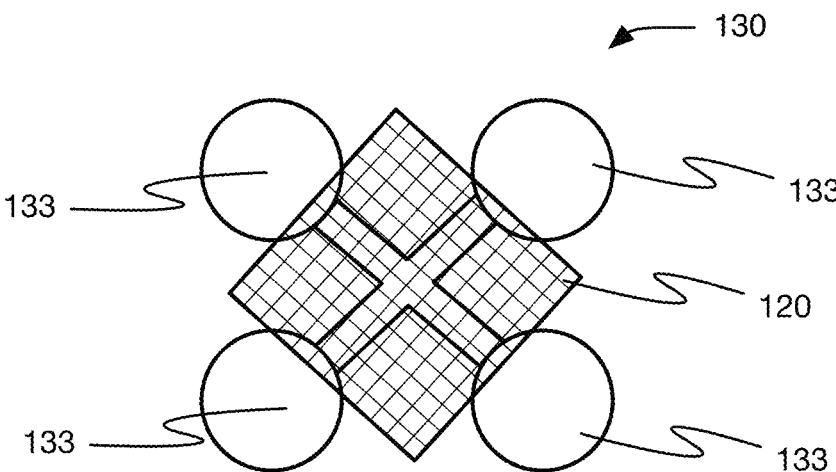
Figure 11A:
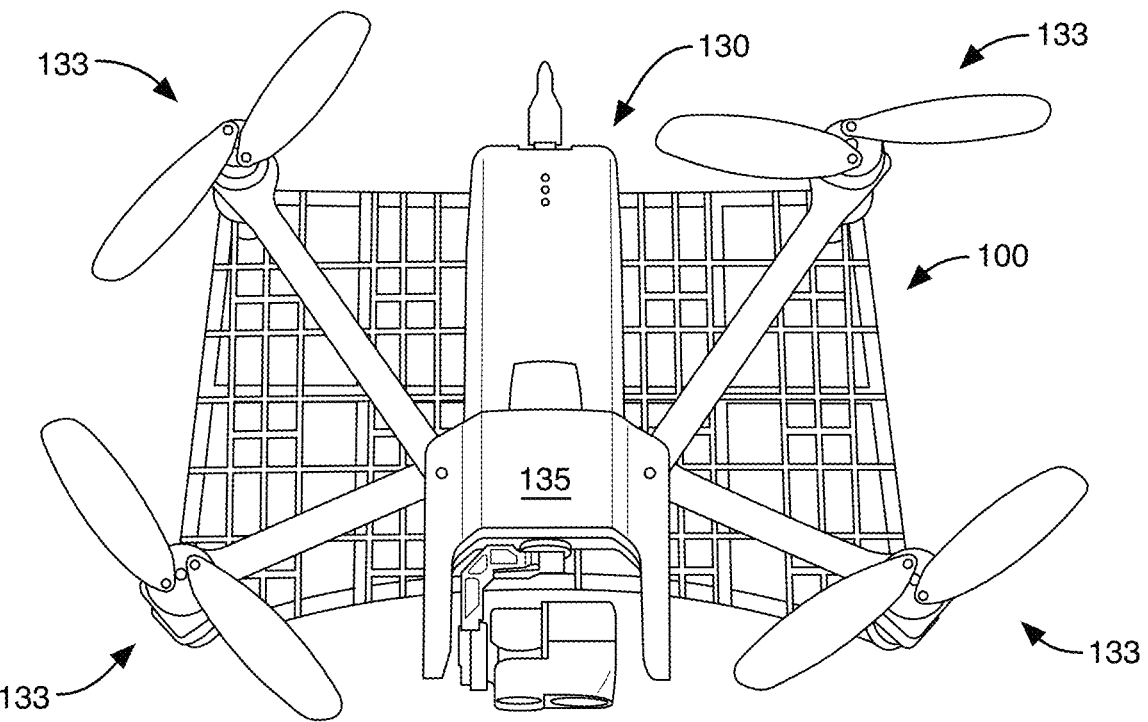
FIG. 11A is a top view of a first specific example of the wireless power system integrated with a multirotor aerial vehicle.
Figure 11B:
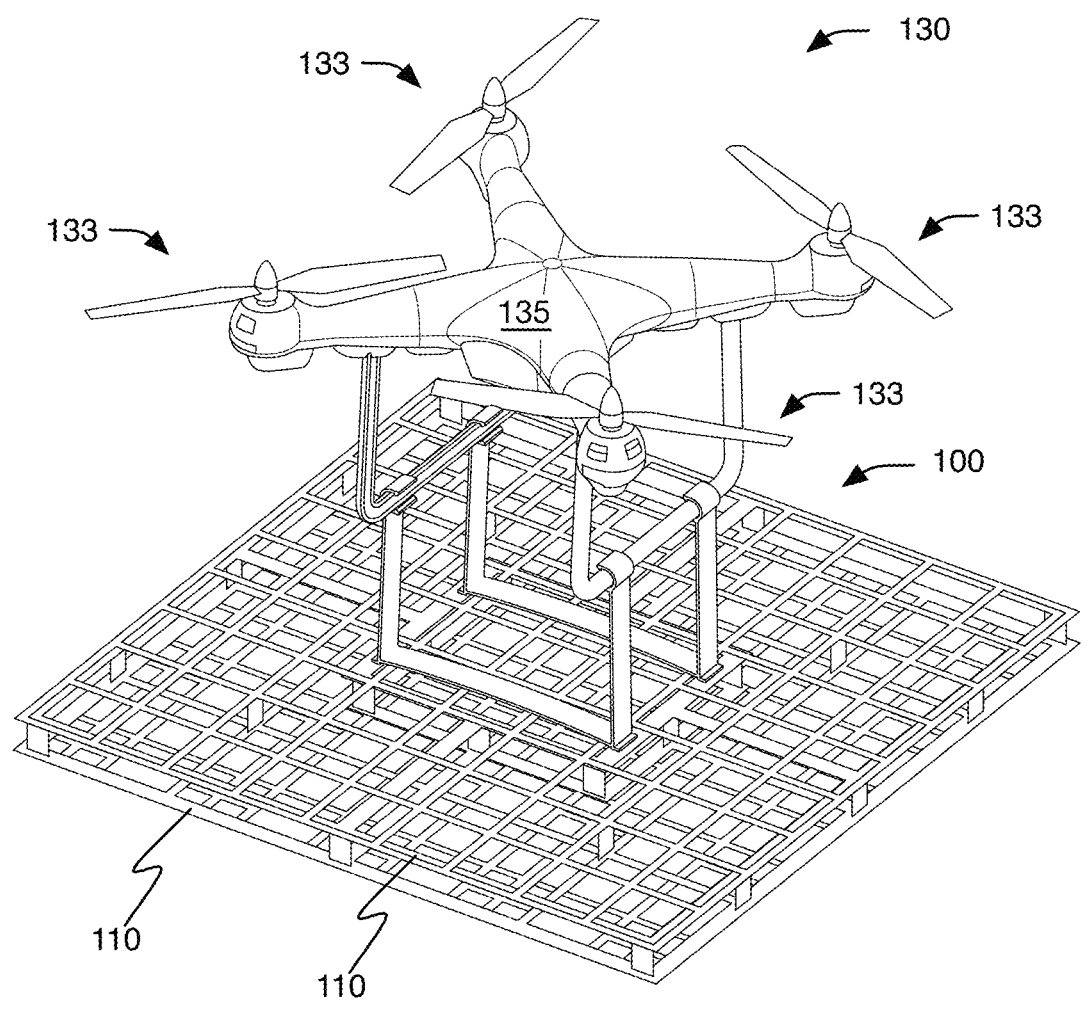
FIGS. 11B-11C are an isometric view and a front view, respectively, of a second specific example of the wireless power system integrated with a multirotor aerial vehicle.
Figure 11C:

The system is preferably configured to reduce interference with vehicle operation (e.g., minimize aerodynamic drag, minimize interference with rotary wing operations, such as minimizing occlusion of rotor downdraft, etc.), but can additionally or alternatively be otherwise configured. In an example of reducing interference with vehicle operation, a substantially square substrate can be arranged with its diagonals between (e.g., equidistant or substantially equidistant between) a projection of the rotors of a multirotor aircraft (e.g., quadcopter) onto the substrate plane, thereby reducing (e.g., minimizing) the overlap of the substrate and the swept area of the rotors (e.g., as shown in FIG. 10B, in contrast with an arrangement in which the substrate diagonals are arranged in line with, such as centered over, the projection of the rotors, such as shown by way of example in FIG. 10A). The substrate 110 is preferably configured to attach mechanically to a vehicle 130 (and/or to any other suitable device with which the system will be integrated). Further, the substrate 110 is preferably configured to electrically connect to the device (e.g., vehicle) and/or the electrical equipment attached thereto (e.g., connecting an electrical output of the wireless power receiver to the device and/or electrical equipment attached thereto).

In some embodiments, the system 100 (e.g., the substrate(s) 110 thereof) can be operable to transition between a stowed configuration and a deployed configuration. In the stowed configuration, the system 100 is preferably configured to reduce or minimize its effect on vehicle (e.g., aerial vehicle such as rotary wing vehicle) operation, such as reducing the system's aerodynamic drag and/or interference with vehicle propulsion and/or control mechanisms (e.g., interference with airflow before and/or interaction with one or more wings and/or control surfaces, such as interference with airflow caused by rotation of one or more rotary wings). In examples, in the stowed configuration, the system 100 (and/or elements thereof) can be folded, rolled, and/or otherwise stowed. In the deployed configuration, the system 100 is preferably able to efficiently receive power wirelessly (e.g., while still ensuring that its effect on vehicle operation is sufficiently low), but can additionally or alternatively be otherwise configured. The system 100 can be configured in a substantially flat or planar configuration and/or can be configured in a substantially maximum-area configuration (e.g., a configuration in which the footprint of the substrate and/or the impedance sheets has the maximum area possible, or close to the maximum area possible), can have a frame 112 in a substantially convex configuration, and/or can have any other suitable configuration. In examples, in the deployed configuration, the system 100 (and/or elements thereof) can be unfolded, unrolled, and/or otherwise deployed. However, the system 100 can additionally or alternatively be operable to transition between any other suitable configurations. The system 100 can additionally or alternatively include any other suitable substrates having any suitable configurations and/or functionalities.

Additionally or alternatively, in some embodiments (e.g., in which the vehicle is a fixed wing aerial vehicle, in which the vehicle is a helicopter, etc.), the wireless power receiver can be arranged on and/or near a fuselage and/or one or more wings of the vehicle, such as wherein the wireless power receiver is attached conformally to the vehicle exterior (e.g., fuselage and/or wing exterior). In such embodiments, the wireless power receiver is preferably arranged on and/or near (e.g., below) an underside of the vehicle (e.g., to facilitate power reception from a terrestrial power transmitter), but can additionally or alternatively be arranged one and/or near the topside and/or one or more lateral sides of the vehicle, and/or have any other suitable arrangement.

Further, the method 100 can additionally or alternatively include and/or be integrated with any other suitable elements in any suitable configuration.

4. Method

The method preferably includes receiving power wirelessly S220 and/or delivering power to one or more electrical loads S230, and can optionally include deploying the system S210 and/or stowing the system S240 (e.g., as shown in FIG. 2).

S220 is preferably performed while the system is deployed (e.g., with the substrate(s), frame(s), and/or impedance sheets in a substantially flat or planar configuration and/or in a substantially maximum area configuration, with the substrate frame in a substantially convex configuration, etc.), but can additionally or alternatively be performed at other times. The power is preferably received via one or more propagating RF modes, but can additionally or alternatively be received via one or more evanescent RF modes and/or from any other suitable sources. The RF radiation is preferably absorbed by a set of antenna elements (e.g., defining one or more absorber sheets) of the system, but can additionally or alternatively be otherwise absorbed. For example, S220 can include receiving the power from one or more transmitters configured to transmit power wirelessly (e.g., to the receiver) at the design wavelength (e.g., wherein receiving power wirelessly is preferably performed in response to the power being transmitted to the receiver). In some examples, S220 can be performed such as described in U.S. patent application Ser. No. 18/674,945, filed 27 May 2024 and titled "SYSTEM AND METHOD FOR WIRELESS POWER RECEPTION" and/or in U.S. patent application Ser. No. 18/891,137, filed 20 Sep. 2024 and titled "METHOD AND SYSTEM FOR WIRELESS POWER DELIVERY", each of which is herein incorporated in its entirety by this reference. However, S220 can additionally or alternatively include receiving power wirelessly in any other suitable manner.

However, receiving power wirelessly S220 may be otherwise performed.

S230 is preferably performed concurrently (or substantially concurrently) with receiving power wirelessly, but can additionally or alternatively be performed with any other suitable timing. S230 more preferably includes delivering the power that is received wirelessly (or a significant fraction thereof, such as the majority thereof) to the one or more electrical loads, but can additionally or alternatively include delivering power from other sources. The power is preferably rectified (e.g., before or after being delivered, more preferably before), but can additionally or alternatively be converted to any suitable frequency (e.g., slower AC frequency, such as about 50 Hz, about 60 Hz, 10-500 Hz, etc.) and/or be used in any other suitable manner (e.g., be used as RF power, without rectification and/or frequency conversion). For example, the power can be received as RF power and can be rectified (e.g., at the system, such as within one or more of the impedance sheets, at one or more of the non-linear structures, at one or more external RF-DC converters, etc.) and then delivered to the one or more electrical loads as DC power (e.g., as described in U.S. patent application Ser. No. 18/674,945, filed 27 May 2024 and titled "SYSTEM AND METHOD FOR WIRELESS POWER RECEPTION", which is herein incorporated in its entirety by this reference). The power is preferably rectified at a set of non-linear structures (e.g., RF-DC converters) that electrically connect the antenna elements to a set of conductive manifolds. S230 preferably delivers the power to the electrical load via one or more conductive manifolds (e.g., that electrically connect the rectifiers to the electrical load), but can additionally or alternatively be otherwise delivered. In an example, the power can be delivered via two conductive manifolds, wherein one conductive manifold defines a high-potential leg of the circuit, and the other conductive manifold defines a low-potential (e.g., ground) leg of the circuit. The one or more electrical loads are preferably associated with (e.g., part of, integrated with, attached to, etc.) a vehicle (e.g., aerial vehicle, such as a quadcopter or other rotary wing vehicle) with which the system is integrated, but can additionally or alternatively be otherwise associated. For example, S230 can include delivering the electrical power that was received wirelessly to an electrical system of an aerial vehicle with which the system is integrated (e.g., to a battery thereof). However, S230 can additionally or alternatively include delivering power in any other suitable manner.

However, delivering power to one or more electrical loads S230 may be otherwise performed.

In an example, deploying the system S210 can be performed by controlling the system (e.g., the substrate thereof) to switch to a deployed configuration. In examples, S210 can be performed in response to determining that a battery charge state is below a threshold value and/or will be reduced below a threshold value in less than a threshold amount of time, in response to determining that current and/or anticipated flight commands can be satisfied while the system is in the deployed configuration (e.g., determining that the deleterious effects of having the system in the deployed configuration, such as increased aerodynamic drag and/or interference with airflow from rotors, will not prevent satisfactory operation according to current and/or anticipated flight plans), in response to determining that a wireless power transmitter is available and/or within range (e.g., able to transmit power efficiently to the system), in response to receipt of a command to deploy and/or receive power (e.g., received from a controller, such as from a wireless power transmitter), and/or with any other suitable timing. However, S210 can additionally or alternatively include deploying the system in any other suitable manner and/or with any other suitable timing.

However, deploying the system S210 may be otherwise performed.

In an example of stowing the system, the stowing can be performed by controlling the system (e.g., the substrate thereof) to switch to a stowed configuration. In examples, S240 can be performed in response to determining that a battery charge state is above a threshold value, in response to determining that a wireless power reception event has ended (e.g., the system is no longer receiving power wirelessly, the amount of power being received wirelessly is less than a threshold amount, etc.), in response to determining that current and/or anticipated flight commands cannot be satisfied and/or have a significant risk of not being able to be satisfied while the system is in the deployed configuration (e.g., determining that the deleterious effects of having the system in the deployed configuration, such as increased aerodynamic drag and/or interference with airflow from rotors, may prevent satisfactory operation according to current and/or anticipated flight plans), in response to determining that no wireless power transmitter is available and/or within range (e.g., able to transmit power efficiently to the system), in response to receipt of a command to stow and/or cease receiving power (e.g., received from a controller, such as from a wireless power transmitter), and/or with any other suitable timing. However, S240 can additionally or alternatively include stowing the system in any other suitable manner and/or with any other suitable timing.

However, stowing the system S240 may be otherwise performed.

Further, the method 200 can additionally or alternatively include any other suitable elements performed in any suitable manner.

The method can be performed during operation of the vehicle (e.g., during aerial vehicle flight), such as during a sustained vehicle mission (e.g., surveillance mission), and/or any other suitable times. All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

5. Specific Examples

A numbered list of specific examples of the technology described herein are provided below. A person of skill in the art will recognize that the scope of the technology is not limited to and/or by these specific examples.

1. A wireless power system comprising:
   a substrate defining a first broad face and a second broad face, wherein:
   the substrate is a dielectric;
   the second broad face is substantially parallel to the first broad face;
   the substrate defines a first plane substantially parallel to the first broad face; and
   the substrate defines a plurality of apertures, wherein each aperture of the plurality intersects the first broad face, the second broad face, and the first plane;
   a first set of electrical conductors, wherein each electrical conductor of the first set:
   is electrically connected to all other electrical conductors of the first set;

is arranged on a second plane, the second plane substantially parallel to the first plane; and
does not intersect the plurality of apertures;
a second set of electrical conductors, wherein each electrical conductor of the second set:
is electrically connected to all other electrical conductors of the second set; and
does not intersect the plurality of apertures;
a plurality of rectifiers, wherein, for each rectifier of the plurality:
the rectifier comprises a respective first DC output terminal and a respective second DC output terminal;
the respective first DC output terminal is electrically connected to the first set of electrical conductors; and
the respective second DC output terminal is electrically connected to the second set of electrical conductors; and
a plurality of antenna elements, wherein each antenna element of the plurality of antenna elements:
is electrically connected to none of the other antenna elements of the plurality of antenna elements;
is electrically connected to a respective rectifier of the plurality of rectifiers;
is electromagnetically coupled, via a set of radio frequency (RF) evanescent modes through at least one of the substrate or the plurality of apertures, to the first set of electrical conductors;
is arranged on the first plane; and does not intersect the plurality of apertures.

2. The wireless power system of Specific Example 1, wherein the plurality of antenna elements comprising:
   a first set of antenna elements defining a first polarization orientation; and
   a second set of antenna elements defining a second polarization orientation substantially different from the first polarization orientation.

3. The wireless power system of Specific Example 2, wherein:
   the plurality of antenna elements and the plurality of apertures cooperatively define a substantially regular array comprising a plurality of substantially identical unit cells; and
   the first set of antenna elements comprises a first set of dipole antennas defining a first dipole orientation;
   the second set of antenna elements comprises a second set of dipole antennas defining a second dipole orientation substantially orthogonal to the first dipole orientation; and
   each unit cell of the plurality comprises:
   a respective aperture of the plurality of apertures;
   a respective first dipole antenna of the first set of dipole antennas; and
   a respective second dipole antenna of the second set of dipole antennas.

4. The wireless power system of any of the preceding Specific Examples, wherein the plurality of antenna elements defines a substantially regular array.

5. The wireless power system of Specific Example 4, wherein:
   the plurality of antenna elements defines a radio frequency (RF) resonance wavelength for absorption of RF radiation; and
   the substantially regular array comprises a plurality of substantially identical unit cells, wherein a length dimension of each unit cell of the plurality does not exceed twice the RF resonance wavelength.

6. The wireless power system of any of the preceding Specific Examples, wherein the plurality of antenna elements comprises a plurality of dipole antennas.

7. The wireless power system of any of the preceding Specific Examples, further comprising a set of electric-field-coupled resonators arranged on the second plane, the set of electric-field-coupled resonators comprising the first set of electrical conductors.

8. The wireless power system of Specific Example 7, wherein:

each electric-field-coupled resonator of the set comprises a respective capacitive element;

the plurality of antenna elements defines:

a plurality of tap points comprising, for each antenna element of the plurality, a respective set of tap points at which the antenna element is electrically connected to the plurality of rectifiers; and a plurality of tap axes normal to the first plane, the plurality of tap axes comprising, for each tap point of the plurality, a respective tap axis that intersects the tap point; and for each electric-field-coupled resonator of the set, the respective capacitive element does not intersect the plurality of tap axes.

9. The wireless power system of any of the preceding Specific Examples, wherein:

a normal projection, onto the first plane, of the first and second sets of electrical conductors defines a first obstructed region;

a normal projection, onto the first plane, of the plurality of antenna elements defines a second obstructed region; and at least 90% of the second obstructed region lies within the first obstructed region.

10. A wireless power system comprising:

a substrate defining a first broad face and a second broad face, wherein:

the substrate is a dielectric;

the second broad face is substantially parallel to the first broad face;

the substrate defines a first plane substantially parallel to the first broad face; and the substrate defines a plurality of apertures, wherein each aperture of the plurality intersects the first broad face, the second broad face, and the first plane;

a first set of electrical conductors, wherein each electrical conductor of the first set:

is electrically connected to all other electrical conductors of the first set;

is arranged on a second plane, the second plane substantially parallel to the first plane; and does not intersect the plurality of apertures;

a plurality of rectifiers, wherein each rectifier of the plurality is electrically connected to the first set of electrical conductors;

a first set of antenna elements defining a first polarization, wherein each antenna element of the first set of antenna elements:

defines a respective polarization substantially equal to the first polarization;

is electrically connected to a respective rectifier of the plurality of rectifiers;

is arranged on the first plane; and does not intersect the plurality of apertures; and a second set of antenna elements defining a second polarization substantially different from the first polarization, wherein each antenna element of the second set of antenna elements:

defines a respective polarization substantially identical to the second polarization;

is electrically connected to a respective rectifier of the plurality of rectifiers;

is arranged in the substrate; and does not intersect the plurality of apertures;

wherein the first and second sets of antenna elements are electromagnetically coupled to the first set of electrical conductors via at least one of the substrate or the plurality of apertures.

11. The wireless power system of Specific Example 10, wherein the second polarization orientation is substantially orthogonal to the first polarization orientation.

12. The wireless power system of Specific Example 10 or 11, wherein:

the first set of antenna elements, the second set of antenna elements, and the plurality of apertures cooperatively define a substantially regular array comprising a plurality of substantially identical unit cells; and each unit cell of the plurality comprises:

a respective aperture of the plurality of apertures;

a respective first antenna element of the first set of antenna elements; and a respective second antenna element of the second set of antenna elements.

13. The wireless power system of any of Specific Examples 10-12, wherein the first set of antenna elements comprises a first set of dipole antennas and the second set of antenna elements comprises a second set of dipole antennas.

14. The wireless power system of any of Specific Examples 10-13, further comprising a set of electric-field-coupled resonators arranged on the second plane, the set of electric field-coupled resonators comprising the first set of electrical conductors.

15. The wireless power system of any of Specific Examples 10-14, further comprising a second set of electrical conductors, wherein:

each rectifier of the plurality comprises a respective first DC output terminal and a respective second DC output terminal;

for each rectifier of the plurality, the rectifier is electrically connected to the first set of electrical conductors at the respective first DC output terminal; and each electrical conductor of the second set:

is electrically connected to all other electrical conductors of the second set;

does not intersect the plurality of apertures; and is electrically connected to the second DC output terminal of each rectifier of the plurality of rectifiers.

16. The wireless power system of any of Specific Examples 10-15, further comprising an aerial vehicle comprising a set of rotary wings and an electrical energy store operable to power the set of rotary wings, the electrical energy store electrically connected to the first set of electrical conductors, wherein the aerial vehicle is mechanically connected to the substrate.

17. The wireless power system of any of Specific Examples 10-16, further comprising a plurality of reflector elements arranged on a third plane between the first plane and the second plane, wherein:

the first set of antenna elements defines a radio frequency (RF) resonance wavelength for absorption of RF radiation;

the third plane is substantially parallel to the first plane;

a distance between the first plane and the third plane is substantially less than one quarter of the RF resonance wavelength; and the plurality of reflector elements comprises, for each antenna element of the first set, a respective reflector element configured to reflect RF radiation toward the antenna element.

18. The wireless power system of any of Specific Examples 10-17, wherein:

a normal projection, onto the first plane, of the first set of electrical conductors defines a first obstructed region;

a normal projection, onto the first plane, of the first and second sets of antenna elements defines a second obstructed region; and at least 90% of the second obstructed region lies within the first obstructed region.

19. The wireless power system of any of Specific Examples 10-18, wherein the first plane is the first broad face.

20. The wireless power system of Specific Example 19, wherein each antenna element of the second set of antenna elements is arranged on the first plane.

21. The wireless power system of any of the preceding Specific Examples, wherein the plurality of antenna elements defines a radio frequency (RF) resonance wavelength for absorption of RF radiation.

22. The wireless power system of Specific Example 21, wherein an absorption coefficient for the plurality of antenna elements at the RF resonance wavelength is greater than 0.9.

23. The wireless power system of Specific Example 22, wherein the absorption coefficient is about unity.

24. A method of operation for a wireless power system, the method comprising, at the wireless power system of any of the preceding Specific Examples, receiving radio frequency (RF) power wirelessly.

25. The method of Specific Example 24, further comprising, concurrent with receiving the RF power wirelessly, delivering electric power to an electrical load electrically connected to the wireless power system.

26. The method of Specific Example 25, further comprising rectifying the RF power to convert it to DC electric power, wherein delivering electric power comprises delivering a portion of the DC electric power.

27. The method of any of Specific Examples 24-26, further comprising, while receiving the RF power wirelessly, flying an aerial vehicle connected to the wireless power system, wherein the aerial vehicle comprises the electrical load, wherein flying the aerial vehicle comprises using electric power delivered to the electrical load by the wireless power system.

28. The method of Specific Example 27, further comprising, while flying the aerial vehicle:

before receiving the RF power wirelessly, deploying the wireless power system; and after receiving the RF power wirelessly, stowing the wireless power system.

29. The method of any of Specific Examples 24-26, further comprising:

before receiving the RF power wirelessly, deploying the wireless power system; and after receiving the RF power wirelessly, stowing the wireless power system.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken line in the figures. However, unbroken lines in the figures should not be interpreted to indicate that the depicted elements are essential or may not be omitted from variants of the invention.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A wireless power system comprising:
a substrate defining a first broad face and a second broad face, wherein:
the substrate is a dielectric;
the second broad face is substantially parallel to the first broad face;
the substrate defines a first plane substantially parallel to the first broad face; and
the substrate defines a plurality of apertures, wherein each aperture of the plurality intersects the first broad face, the second broad face, and the first plane;
a first set of electrical conductors, wherein each electrical conductor of the first set:
is electrically connected to all other electrical conductors of the first set;
is arranged on a second plane, the second plane substantially parallel to the first plane; and
does not intersect the plurality of apertures;
a second set of electrical conductors, wherein each electrical conductor of the second set:
is electrically connected to all other electrical conductors of the second set; and
does not intersect the plurality of apertures;
a plurality of rectifiers, wherein, for each rectifier of the plurality:
the rectifier comprises a respective first DC output terminal and a respective second DC output terminal;
the respective first DC output terminal is electrically connected to the first set of electrical conductors; and
the respective second DC output terminal is electrically connected to the second set of electrical conductors; and
a plurality of antenna elements, wherein each antenna element of the plurality of antenna elements:
is electrically connected to none of the other antenna elements of the plurality of antenna elements;
is electrically connected to a respective rectifier of the plurality of rectifiers;
is electromagnetically coupled, via a set of radio frequency (RF) evanescent modes through at least one of the substrate or the plurality of apertures, to the first set of electrical conductors;
is arranged on the first plane; and
does not intersect the plurality of apertures.

2. The wireless power system of claim 1, wherein the plurality of antenna elements comprising:
a first set of antenna elements defining a first polarization orientation; and
a second set of antenna elements defining a second polarization orientation substantially different from the first polarization orientation.

3. The wireless power system of claim 2, wherein:
the plurality of antenna elements and the plurality of apertures cooperatively define a substantially regular array comprising a plurality of substantially identical unit cells; and the first set of antenna elements comprises a first set of dipole antennas defining a first dipole orientation;
the second set of antenna elements comprises a second set of dipole antennas defining a second dipole orientation substantially orthogonal to the first dipole orientation; and
each unit cell of the plurality comprises:
a respective aperture of the plurality of apertures;
a respective first dipole antenna of the first set of dipole antennas; and
a respective second dipole antenna of the second set of dipole antennas.

4. The wireless power system of claim 1, wherein the plurality of antenna elements defines a substantially regular array.

5. The wireless power system of claim 4, wherein:
the plurality of antenna elements defines a radio frequency (RF) resonance wavelength for absorption of RF radiation; and
the substantially regular array comprises a plurality of substantially identical unit cells, wherein a length dimension of each unit cell of the plurality does not exceed twice the RF resonance wavelength.

6. The wireless power system of claim 1, wherein the plurality of antenna elements comprises a plurality of dipole antennas.

7. The wireless power system of claim 1, further comprising a set of electric-field-coupled resonators arranged on the second plane, the set of electric-field-coupled resonators comprising the first set of electrical conductors.

8. The wireless power system of claim 7, wherein:
each electric-field-coupled resonator of the set comprises a respective capacitive element;
the plurality of antenna elements defines:
a plurality of tap points comprising, for each antenna element of the plurality, a respective set of tap points at which the antenna element is electrically connected to the plurality of rectifiers; and
a plurality of tap axes normal to the first plane, the plurality of tap axes comprising, for each tap point of the plurality, a respective tap axis that intersects the tap point; and
for each electric-field-coupled resonator of the set, the respective capacitive element does not intersect the plurality of tap axes.

9. The wireless power system of claim 1, wherein:
a normal projection, onto the first plane, of the first and second sets of electrical conductors defines a first obstructed region;
a normal projection, onto the first plane, of the plurality of antenna elements defines a second obstructed region; and
at least 90% of the second obstructed region lies within the first obstructed region.

10. A wireless power system comprising:
a substrate defining a first broad face and a second broad face, wherein:
the substrate is a dielectric;
the second broad face is substantially parallel to the first broad face;
the substrate defines a first plane substantially parallel to the first broad face; and
the substrate defines a plurality of apertures, wherein each aperture of the plurality intersects the first broad face, the second broad face, and the first plane;
a first set of electrical conductors, wherein each electrical conductor of the first set:

is electrically connected to all other electrical conductors of the first set;

is arranged on a second plane, the second plane substantially parallel to the first plane; and does not intersect the plurality of apertures;

a plurality of rectifiers, wherein each rectifier of the plurality is electrically connected to the first set of electrical conductors;

a first set of antenna elements defining a first polarization, wherein each antenna element of the first set of antenna elements:

defines a respective polarization substantially equal to the first polarization;

is electrically connected to a respective rectifier of the plurality of rectifiers;

is arranged on the first plane; and does not intersect the plurality of apertures; and a second set of antenna elements defining a second polarization substantially different from the first polarization, wherein each antenna element of the second set of antenna elements:

defines a respective polarization substantially identical to the second polarization;

is electrically connected to a respective rectifier of the plurality of rectifiers;

is arranged in the substrate; and does not intersect the plurality of apertures;

wherein the first and second sets of antenna elements are electromagnetically coupled to the first set of electrical conductors via at least one of the substrate or the plurality of apertures.

11. The wireless power system of claim 10, wherein the second polarization orientation is substantially orthogonal to the first polarization orientation.

12. The wireless power system of claim 10, wherein:

the first set of antenna elements, the second set of antenna elements, and the plurality of apertures cooperatively define a substantially regular array comprising a plurality of substantially identical unit cells; and each unit cell of the plurality comprises:

a respective aperture of the plurality of apertures;

a respective first antenna element of the first set of antenna elements; and a respective second antenna element of the second set of antenna elements.

13. The wireless power system of claim 10, wherein the first set of antenna elements comprises a first set of dipole antennas and the second set of antenna elements comprises a second set of dipole antennas.

14. The wireless power system of claim 10, further comprising a set of electric-field-coupled resonators arranged on the second plane, the set of electric field-coupled resonators comprising the first set of electrical conductors.

15. The wireless power system of claim 10, further comprising a second set of electrical conductors, wherein:

each rectifier of the plurality comprises a respective first DC output terminal and a respective second DC output terminal;

for each rectifier of the plurality, the rectifier is electrically connected to the first set of electrical conductors at the respective first DC output terminal; and each electrical conductor of the second set:

is electrically connected to all other electrical conductors of the second set;

does not intersect the plurality of apertures; and is electrically connected to the second DC output terminal of each rectifier of the plurality of rectifiers.

16. The wireless power system of claim 10, further comprising an aerial vehicle comprising a set of rotary wings and an electrical energy store operable to power the set of rotary wings, the electrical energy store electrically connected to the first set of electrical conductors, wherein the aerial vehicle is mechanically connected to the substrate.

17. The wireless power system of claim 10, further comprising a plurality of reflector elements arranged on a third plane between the first plane and the second plane, wherein:

the first set of antenna elements defines a radio frequency (RF) resonance wavelength for absorption of RF radiation;

the third plane is substantially parallel to the first plane;

a distance between the first plane and the third plane is substantially less than one quarter of the RF resonance wavelength; and the plurality of reflector elements comprises, for each antenna element of the first set, a respective reflector element configured to reflect RF radiation toward the antenna element.

18. The wireless power system of claim 10, wherein:

a normal projection, onto the first plane, of the first set of electrical conductors defines a first obstructed region;

a normal projection, onto the first plane, of the first and second sets of antenna elements defines a second obstructed region; and at least 90% of the second obstructed region lies within the first obstructed region.

19. The wireless power system of claim 10, wherein the first plane is the first broad face.

20. The wireless power system of claim 19, wherein each antenna element of the second set of antenna elements is arranged on the first plane.

* * * * *